United States Patent
Huang

(10) Patent No.: US 8,432,619 B2
(45) Date of Patent: Apr. 30, 2013

(54) IMAGE CAPTURING LENS ASSEMBLY

(75) Inventor: Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 63 days.

(21) Appl. No.: 13/176,764

(22) Filed: Jul. 6, 2011

(65) Prior Publication Data

US 2012/0229917 A1   Sep. 13, 2012

(30) Foreign Application Priority Data

Mar. 11, 2011   (TW) .............................. 100108339 A

(51) Int. Cl.
 *G02B 3/02*   (2006.01)
 *G02B 9/62*   (2006.01)
(52) U.S. Cl.
 USPC ......................................... 359/713; 359/757

(58) Field of Classification Search .................. 359/708, 359/713, 754–759
See application file for complete search history.

(56) References Cited

U.S. PATENT DOCUMENTS

| 4,924,244 | A | * | 5/1990 | Kataoka et al. | ............... 359/649 |
| 5,048,940 | A | * | 9/1991 | Ueda et al. | ................... 359/708 |
| 7,286,302 | B2 | * | 10/2007 | Ohzawa et al. | ............... 359/749 |

* cited by examiner

*Primary Examiner* — Darryl J Collins
(74) *Attorney, Agent, or Firm* — CKC & Partners Co., Ltd.

(57) ABSTRACT

An image capturing lens assembly includes, in order from an object side to an image side: the first lens element with positive refractive power, the second lens element with refractive power, the third lens element with positive refractive power, the fourth lens element with refractive power, the fifth lens element with refractive power, and the sixth lens element with refractive power, at least one surface of the sixth lens element thereof being aspheric and having at least one inflection point. By such arrangement, total track length and the photosensitivity of the image capturing lens assembly can also be effectively reduced while retaining high image quality.

12 Claims, 18 Drawing Sheets

IMAGE CAPTURING LENS ASSEMBLY

RELATED APPLICATIONS

The application claims priority to Taiwan Application Serial Number 100108339, filed Mar. 11, 2011, which is herein incorporated by reference.

BACKGROUND

1. Technical Field

The present disclosure relates to an image capturing lens assembly. More particularly, the present disclosure relates to a compact image capturing lens assembly applicable to electronic products.

2. Description of Related Art

In recent years, with the popularity of mobile products with camera functionalities, the demand for compact image capturing lenses is increasing, and the sensor of a conventional image capturing camera is none other than CCD (Charge Coupled Device) or CMOS (Complementary Metal-Oxide Semiconductor Sensor). Furthermore, as advanced semiconductor manufacturing technology has allowed the pixel size of sensors to be reduced and compact image capturing lenses have gradually evolved toward higher megapixels, there is an increasing demand for compact image capturing lenses featuring better image quality.

A conventional compact image capturing lens assembly applied on a portable electronic product mainly adopts a four-element lens structure, as disclosed in U.S. Pat. No. 7,365,920. Due to the popularity of high specification mobile products, such as smart phones and PDAs (Personal Digital Assistants), the requirements of pixels and image quality of the compact image capturing lens assembly increase rapidly. However, the conventional four-piece lens structure cannot satisfy the requirements of the compact image capturing lens assembly. Furthermore, the trend of modern electronics gradually moves toward high performance and compact size. Therefore, a need exists in the art for providing an image capturing lens assembly having excellent imaging quality and without a long total track length for portable mobile electronics.

SUMMARY

According to one aspect of the present disclosure provides an image capturing lens assembly including, in order from an object side to an image side: a first lens element, a second lens element, a third lens element, a fourth lens element, a fifth lens element and a sixth lens element. The first lens element is with positive refractive power. The second lens element is with refractive power. The third lens element with positive refractive power has a convex image-side surface. The fourth lens element is with refractive power, wherein at least one surface of the fourth lens element is aspheric. The fifth lens element is with refractive power, wherein at least one surface of the fifth lens element is aspheric. The sixth lens element is with refractive power, wherein at least one surface of the sixth lens element is aspheric, and the sixth lens element has at least one inflection point formed on at least one of the object-side surface and the image-side surface thereof. A focal length of the first lens element is f1, a focal length of the third lens element is f3, a curvature radius of the object-side surface of the second lens element is R3, a curvature radius of the image-side surface of the second lens element is R4, and they satisfy the following relationships:

$$0.0 < f3/f1 < 0.8; \text{ and}$$

$$0.0 < (R3-R4)/(R3+R4) < 0.7.$$

According to another aspect of the present disclosure, an image capturing lens assembly includes, in order from an object side to an image side: a front lens group, a stop and a rear lens group. The front lens group including, in order from the object side to the image side: a first lens element and a second lens element. The first lens element is with positive refractive power. The second lens element is with negative refractive power. The rear lens group including, in order from the object side to the image side: a third lens element, a fourth lens element, a fifth lens element and a sixth lens element. The third lens element is with positive refractive power has a convex object-side surface and a convex image-side surface. The fourth lens element with refractive power is made of plastic material. The fifth lens element with refractive power is made of plastic material. The sixth lens element with negative refractive power is made of plastic material, wherein the object-side and the image-side surfaces of the sixth lens element are aspheric, and the sixth lens element has at least one inflection point formed on at least one of the object-side surface and the image-side surface thereof. A curvature radius of the object-side surface of the third lens element is R5, a curvature radius of the image-side surface of the third lens element is R6, and they satisfy the following relationship:

$$0.0 < (R5+R6)/(R5-R6) < 0.7.$$

According to further another aspect of the present disclosure, an image capturing lens assembly includes, in order from an object side to an image side: a first lens element, a second lens element, a third lens element, a fourth lens element, a fifth lens element and a sixth lens element. The first lens element is with positive refractive power. The second lens element is with negative refractive power. The third lens element is with positive refractive power. The fourth lens element with negative refractive power has at least one inflection point formed on at least one of the object-side surface and the image-side surface thereof. The fifth lens element is with negative refractive power. The sixth lens element is with negative refractive power. An axial distance between the first lens element and the second lens element is T12, an axial distance between the second lens element and the third lens element is T23, and they satisfy the following relationship:

$$0.01 < T12/T23 < 0.8.$$

DETAILED DESCRIPTION

Figure 1:
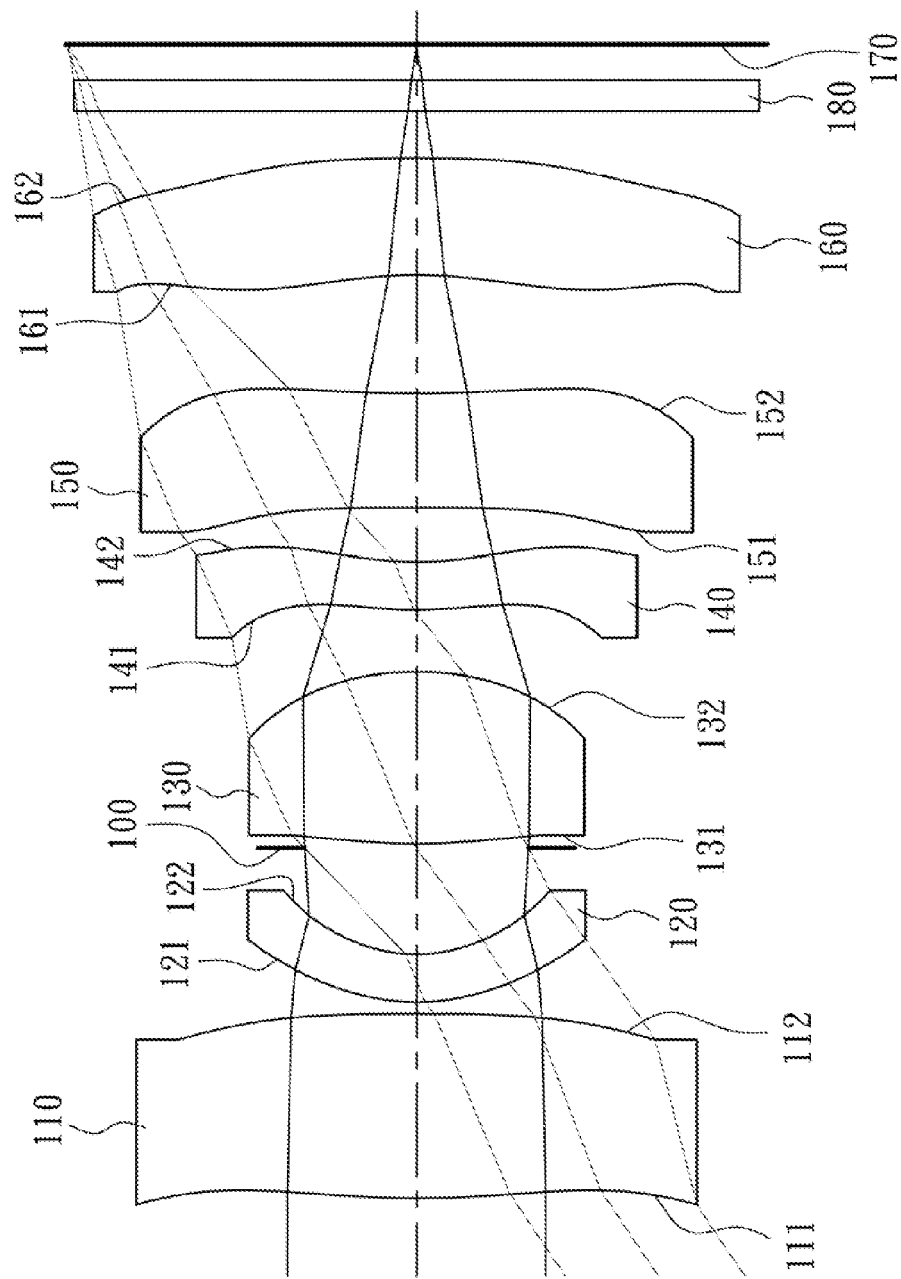
FIG. 1 is a schematic view of an image capturing lens assembly according to the first embodiment of the present disclosure.

An image capturing lens assembly includes, in order from an object side to an image side: a first lens element, a second lens element, a third lens element, a fourth lens element, a fifth lens element and a sixth lens element. The image capturing lens assembly further includes an image sensor located on an image plane.

The first lens element with positive refractive power provides partial refractive power for reducing the total track length of the image capturing lens assembly.

The second lens element with negative refractive power can effectively correct the aberration generated from the first lens element and meanwhile advantageously correct the chromatic aberration within the image capturing lens assembly.

The third lens element with positive refractive power can reduce the photosensitivity of the image capturing lens assembly by providing a partial distribution of the refractive power of the first lens element. The third lens element has a convex object-side surface and a convex image-side surface which can enhance the positive refractive power of the third lens element, so that the total track length of the image capturing lens assembly can be reduced.

The fourth lens element with negative refractive power can correct the aberration of the third lens element. The fourth lens element can be made of plastic material, and at least one surface thereof is aspheric and has at least one inflection point.

The fifth lens element can be with positive refractive power or negative refractive power. The fifth lens element with positive refractive power can correct the high order aberration of the image capturing lens assembly. The fifth lens element with negative refractive power can correct the Petzval Sum of the image capturing lens assembly for smoothing the peripheral area of the image. The fifth lens element can be made of plastic material and at least one surface thereof is aspheric.

The sixth lens element can be with negative refractive power so that the principal point of the image capturing lens assembly can be positioned away from the image plane, and the total track length of the image capturing lens assembly can be reduced so as to maintain the compact size of the image capturing lens assembly. The sixth lens element can be made of plastic material, and at least one surface thereof is aspheric and has at least one inflection point.

A focal length of the first lens element is f1, a focal length of the third lens element is f3, and they satisfy the following relationship:

$$0.0 < f3/f1 < 0.8.$$

Therefore, the refractive power of the third lens element can be controlled, so that the generation of the aberration and the photosensitivity of the image capturing lens assembly can be reduced.

f1 and f3 can further satisfy the following relationship:

$$0.15 < f3/f1 < 0.45.$$

A curvature radius of the object-side surface of the second lens element is R3, a curvature radius of the image-side surface of the second lens element is R4, and they satisfy the following relationship:

$$0.0 < (R3-R4)/(R3+R4) < 0.7.$$

Therefore, the aberration of the first lens element can be corrected by the second lens element and avoid producing too much aberration.

R3 and R4 can further satisfy the following relationship:

$$0.05 < (R3-R4)/(R3+R4) < 0.4.$$

The image capturing lens assembly further includes a stop, which can be an aperture stop. An axial distance between the stop and an image plane is SL, an axial distance between the object-side surface of the first lens element and the image plane is TTL, and they satisfy the following relationship:

$$0.55 < SL/TTL < 0.75.$$

When the SL/TTL<0.55, the angle of incidence on the image sensor would be too large, which will cause poor photographic performance of the image sensor as well as too much chromatic aberration within the image capturing lens assembly. When the SL/TTL>0.75, the total track length of the image capturing lens assembly would be too long. Therefore, when SL/TTL satisfies the above relationship, the image capturing lens assembly has a good balance between the telecentric and wide-angle characteristics, and a desirable total track length of the image capturing lens assembly can be maintained.

A focal length of the image capturing lens assembly is f, the focal length of the third lens element is f3, and they satisfy the following relationship:

$$1.4 < f/f3 < 2.8.$$

Therefore, the refractive power of the third lens element can reduce the total track length of the image capturing lens assembly effectively.

f and f3 can further satisfy the following relationship:

$$1.7 < f/f3 < 2.5.$$

The focal length of the image capturing lens assembly is f, a focal length of the sixth lens element is f6, and they satisfy the following relationship:

$$-1.3 < f/f6 < -0.6.$$

Therefore, the refractive power of the sixth lens element can let the principal point of the image capturing lens assembly be positioned away from the image plane, and the total track length of the image capturing lens assembly can be reduced so as to maintain the compact size of the image capturing lens assembly.

A curvature radius of the object-side surface of the third lens element is R5, a curvature radius of the image-side surface of the third lens element is R6, and they satisfy the following relationship:

$$0.0 < (R5+R6)/(R5-R6) < 0.7.$$

Therefore, the curvature of the third lens element can enhance the refractive power thereof effectively and correct the aberration of the third lens element.

The distortion of the image capturing lens assembly is DIST, and DIST satisfies the following relationship:

$$DIST < -30\%.$$

Therefore, when the distortion of the image capturing lens assembly satisfies the above relationship, the distortion can be corrected during the image post processing, or the image can be zoomed in or zoomed out digitally through the image cropping.

The Abbe number of the second lens element is V2, the Abbe number of the third lens element is V3, and they satisfy the following relationship:

$$25.0 < V3 - V2 < 45.0.$$

Therefore, the chromatic aberration of the image capturing lens assembly can be corrected.

A curvature radius of the object-side surface of the fourth lens element is R7, a curvature radius of the image-side surface of the fourth lens element is R8, and they satisfy the following relationship:

$$0.2 < R8/R7 < 0.8.$$

Therefore, the astigmatism of the image capturing lens assembly can be corrected.

An axial distance between the first lens element and the second lens element is T12, an axial distance between the second lens element and the third lens element is T23, and they satisfy the following relationship:

$$0.01 < T12/T23 < 0.8.$$

Therefore, the arrangement of the second lens element can reduce the total track length of the image capturing lens assembly.

T12 and T23 can further satisfy the following relationship:

$$0.01 < T12/T23 < 0.3.$$

A curvature radius of the object-side surface of the first lens element is R1, a curvature radius of the image-side surface of the first lens element is R2, and they satisfy the following relationship:

$$-0.5 < R1/R2 < 0.5.$$

Therefore, the spherical aberration of the image capturing lens assembly can be corrected, and the total track length of the image capturing lens assembly can also be reduced so as to maintain the compact size of the image capturing lens assembly.

A half of a diagonal length of an effective photosensitive area of the image sensor is ImgH, an axial distance between the object-side surface of the first lens element and the image plane is TTL, and they satisfy the following relationship:

$$TTL/ImgH < 3.5.$$

When the above relation is satisfied, the total track length of the image capturing lens assembly can be reduced, so as to maintain the compact size of the image capturing lens assembly for applications on lightweight and portable electronic products.

According to the image capturing lens assembly of the present disclosure, the lens element can be made of glass material or plastic material. When the lens element is made of glass material, the distribution of degree of freedom of the refractive power of the image capturing lens assembly can be increased. When the lens element is made of plastic material, the cost of manufacture can be effectively reduced. Besides, the surface of the lens elements can be aspheric, so as to make the surface into other shape except spherical easier for obtaining more controllable variable, and reducing aberration and amount of the lens element. Therefore, the total track length of the image capturing lens assembly can be reduced.

According to the image capturing lens assembly of the present disclosure, the lens element has a convex surface representing the paraxial region of the surface is convex, and the lens element has a concave surface representing the paraxial region of the surface is concave.

According to the image capturing lens assembly of the present disclosure, the image capturing lens assembly can include at least one stop for reducing stray light while retaining high image quality. Furthermore, the position of an aperture stop within an optical system can be arbitrarily placed in front of the entire optical system or within the optical system depending on the preference of the optical designer, in order to achieve the desirable optical features or higher image quality produced from the optical system.

According to the above description of the present disclosure, the following 1st-9th specific embodiments are provided for further explanation.

Figure 2:
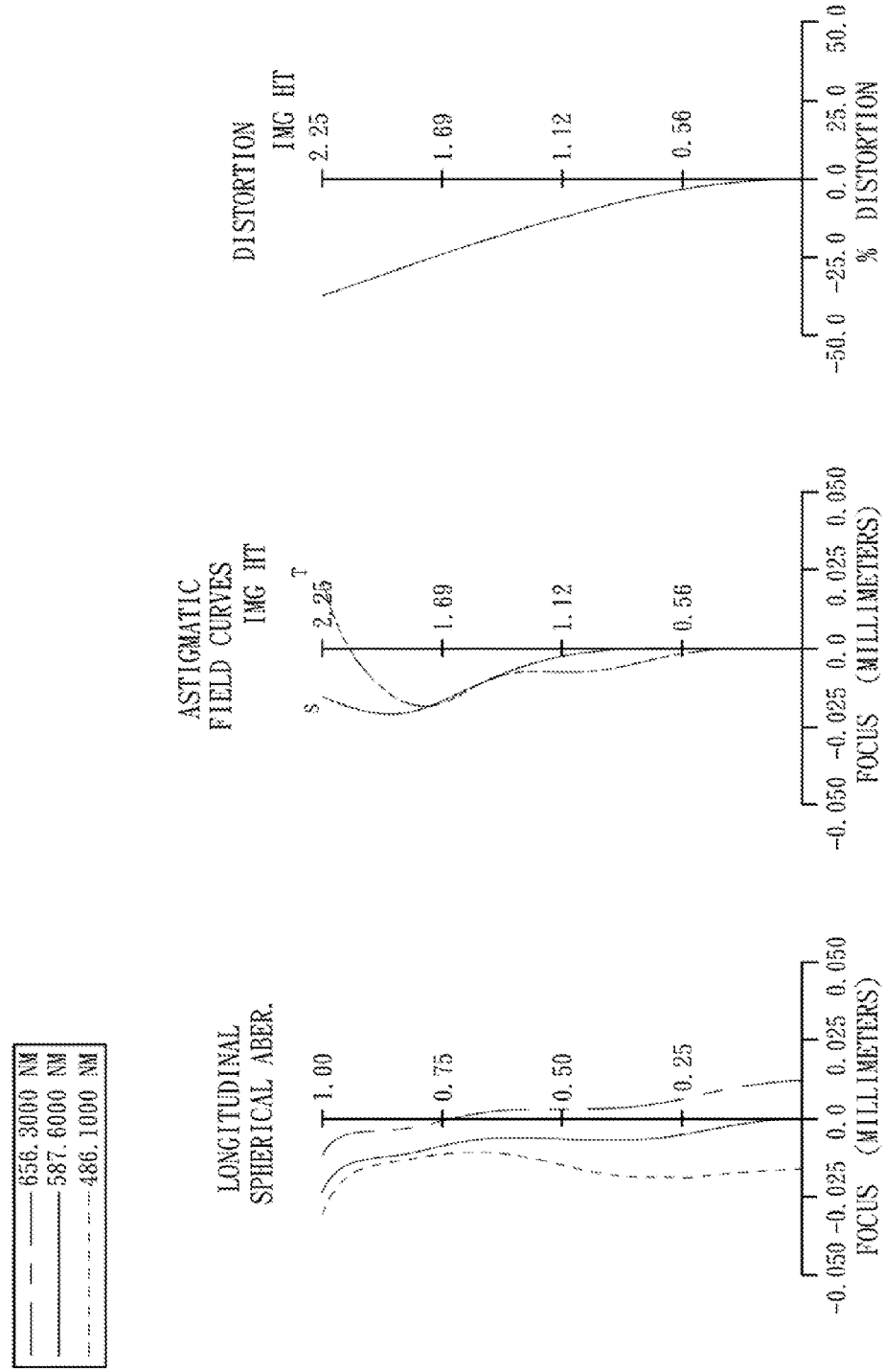
FIG. 2 shows spherical aberration curves, astigmatic field curves and distortion curve of the image capturing lens assembly according to the first embodiment of the present disclosure.

FIG. 1 is a schematic view of an image capturing lens assembly according to the first embodiment of the present disclosure. FIG. 2 shows spherical aberration curves, astigmatic field curves and distortion curve of the image capturing lens assembly according to the first embodiment of the present disclosure. In FIG. 1, the image capturing lens assembly includes, in order from an object side to an image side: the first lens element 110, the second lens element 120, an aperture stop 100, the third lens element 130, the fourth lens element 140, the fifth lens element 150, the sixth lens element 160, an IR (infrared) cut filter 180 and an image plane 170.

The first lens element 110 is made of plastic material. The first lens element 110 with positive refractive power has a convex object-side surface 111 and a convex image-side surface 112. The object-side surface 111 and the image-side surface 112 of the first lens element 110 are aspheric. The first lens element 110 has inflection points formed on the object-side surface 111 and the image-side surface 112 thereof.

The second lens element 120 is made of plastic material. The second lens element 120 with negative refractive power has a convex object-side surface 121 and a concave image-side surface 122. The object-side surface 121 and the image-side surface 122 of the second lens element 120 are aspheric.

The third lens element 130 is made of plastic material. The third lens element 130 with positive refractive power has a convex object-side surface 131 and a convex image-side surface 132. The object-side surface 131 and the image-side surface 132 of the third lens element 130 are aspheric.

The fourth lens element 140 is made of plastic material. The fourth lens element 140 with negative refractive power has a convex object-side surface 141 and a concave image-side surface 142. The object-side surface 141 and the image-side surface 142 of the fourth lens element 140 are aspheric. The fourth lens element 140 has inflection points formed on the object-side surface 141 and the image-side surface 142 thereof.

The fifth lens element 150 is made of plastic material. The fifth lens element 150 with negative refractive power has a concave object-side surface 151 and a concave image-side surface 152. The object-side surface 151 and the image-side surface 152 of the fifth lens element 150 are aspheric.

The sixth lens element 160 is made of plastic material. The sixth lens element 160 with negative refractive power has a concave object-side surface 161 and a convex image-side surface 162. The object-side surface 161 and the image-side surface 162 of the sixth lens element 160 are aspheric. The sixth lens element 160 has inflection points formed on the object-side surface 161 and the image-side surface 162 thereof.

The IR cut filter 180 is made of glass and is located between the sixth lens element 160 and the image plane 170, and will not affect the focal length of the image capturing lens assembly.

The equation of the aspheric surface profiles of the aforementioned lens elements of the first embodiment is expressed as follows:

$$X(Y) = (Y^2/R)/(1 + sqrt(1-(1+k)\times(Y/R)^2)) + \sum_i (Ai)\times(Y^2)$$

wherein:

X: the height of a point on the aspheric surface spaced at a distance Y from the optical axis relative to the tangential plane at the aspheric surface vertex;

Y: the distance from the point on the curve of the aspheric surface to the optical axis;

k: the conic coefficient; and

Ai: the i-th aspheric coefficient.

In the image capturing lens assembly according to the first embodiment, f is a focal length of the image capturing lens assembly, Fno is an f-number of the image capturing lens assembly, HFOV is half of the maximal field of view, and they satisfy the following relationships:

$f=5.31$ mm;

$Fno=3.20$; and $HFOV=34.0$ degrees.

In the image capturing lens assembly according to the first embodiment, the Abbe number of the second lens element 120 is V2, the Abbe number of the third lens element 130 is V3, and they satisfy the following relationship:

$V3-V2=34.9$.

In the image capturing lens assembly according to the first embodiment, a curvature radius of the object-side surface 111 of the first lens element 110 is R1, a curvature radius of the image-side surface 112 of the first lens element 110 is R2, a curvature radius of the object-side surface 121 of the second lens element 120 is R3, a curvature radius of the image-side surface 122 of the second lens element 120 is R4, a curvature radius of the object-side surface 131 of the third lens element 130 is R5, a curvature radius of the image-side surface 132 of the third lens element 130 is R6, a curvature radius of the object-side surface 141 of the fourth lens element 140 is R7, a curvature radius of the image-side surface 142 of the fourth lens element 140 is R8, and they satisfy the following relationships:

$R1/R2=-0.19$;

$(R3-R4)/(R3+R4)=0.18$;

$(R5+R6)/(R5-R6)=0.36$; and $R8/R7=0.74$.

In the image capturing lens assembly according to the first embodiment, an axial distance between the first lens element 110 and the second lens element 120 is T12, an axial distance between the second lens element 120 and the third lens element 130 is T23, and they satisfy the following relationship:

$T12/T23=0.11$.

In the image capturing lens assembly according to the first embodiment, the focal length of the image capturing lens assembly is f, a focal length of the first lens element 110 is f1, a focal length of the third lens element 130 is f3, a focal length of the sixth lens element 160 is f6, and they satisfy the following relationships:

$f3/f1=0.28$;

$f/f3=1.85$; and $f/f6=-0.83$.

In the image capturing lens assembly according to the first embodiment, the distortion of the image capturing lens assembly is DIST, and DIST satisfies the following relationship:

$DIST=-37.1\%$.

In the image capturing lens assembly according to the first embodiment, an axial distance between the aperture stop 100 and the image plane 170 is SL, an axial distance between the object-side surface 111 of the first lens element 110 and the image plane 170 is TTL, and they satisfy the following relationship:

$SL/TTL=0.69$.

In the image capturing lens assembly according to the first embodiment, an image sensor located on the image plane 170, wherein a half of a diagonal length of an effective photosensitive area of the image sensor is ImgH, an axial distance between the object-side surface 111 of the first lens element 110 and the image plane 170 is TTL, and they satisfy the following relationship:

$TTL/ImgH=3.27.$

The detailed optical data of the first embodiment are shown in Table 1, and the aspheric surface data are shown in Table 2 as follows.

TABLE 1

1st Embodiment
f = 5.31 mm, Fno = 3.20, HFOV = 34.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 6.538200 (ASP) | 1.183 | Plastic | 1.544 | 55.9 | 10.17 |
| 2 | | −33.823000 (ASP) | 0.077 | | | | |
| 3 | Lens 2 | 1.417890 (ASP) | 0.310 | Plastic | 1.650 | 21.4 | −7.14 |
| 4 | | 0.992560 (ASP) | 0.679 | | | | |
| 5 | Ape. Stop | Plano | 0.030 | | | | |
| 6 | Lens 3 | 4.492200 (ASP) | 1.103 | Plastic | 1.535 | 56.3 | 2.86 |
| 7 | | −2.125080 (ASP) | 0.399 | | | | |
| 8 | Lens 4 | 2.954870 (ASP) | 0.310 | Plastic | 1.633 | 23.4 | −16.08 |
| 9 | | 2.196860 (ASP) | 0.345 | | | | |
| 10 | Lens 5 | −51.910300 (ASP) | 0.736 | Plastic | 1.535 | 56.3 | −15.80 |
| 11 | | 10.136000 (ASP) | 0.763 | | | | |
| 12 | Lens 6 | −2.788480 (ASP) | 0.750 | Plastic | 1.535 | 56.3 | −6.36 |
| 13 | | −16.924900 (ASP) | 0.300 | | | | |
| 14 | IR-filter | Plano | 0.200 | Glass | 1.517 | 64.2 | — |
| 15 | | Plano | 0.233 | | | | |
| 16 | Image | Plano | — | | | | |

Note:
Reference wavelength (d-line) is 587.6 nm.

TABLE 2

| Aspheric Coefficients | | | | | | |
|---|---|---|---|---|---|---|
| Surface # | 1 | 2 | 3 | 4 | 6 | 7 |
| k = | −4.34316E−01 | −2.02326E+01 | 3.00051E−02 | −2.75645E−02 | −3.25870E+00 | 3.94540E−01 |
| A4 = | −2.64757E−02 | −4.24501E−02 | −6.59345E−02 | −1.06507E−01 | −2.19704E−02 | −1.20601E−01 |
| A6 = | −3.62218E−03 | 1.01368E−02 | −4.07590E−03 | −3.03243E−02 | −5.97426E−02 | 6.67693E−02 |
| A8 = | 6.90755E−04 | −1.27629E−03 | −2.49256E−03 | −1.97577E−02 | 1.68595E−01 | −4.86333E−02 |
| A10 = | 2.18549E−04 | 1.30075E−04 | 5.05842E−04 | −1.11274E−02 | −2.77770E−01 | 8.85408E−03 |
| A12 = | −4.71502E−05 | | | | 1.60271E−01 | |
| A14 = | 2.24869E−06 | | | | | |

| Surface # | 8 | 9 | 10 | 11 | 12 | 13 |
|---|---|---|---|---|---|---|
| k = | −3.19488E−01 | 4.71467E−02 | 3.57146E+01 | 1.91493E+01 | −2.32319E−01 | 3.97017E+01 |
| A4 = | −2.46374E−01 | −1.72908E−02 | −3.41073E−02 | −2.35161E−03 | 1.07006E−01 | −5.92831E−02 |
| A6 = | 5.93423E−02 | 1.30188E−02 | −1.91782E−02 | −2.59873E−02 | −1.33920E−02 | 1.43678E−02 |
| A8 = | −6.23419E−02 | 3.23839E−02 | 5.93570E−03 | 4.62115E−03 | −3.27177E−03 | 4.83969E−03 |
| A10 = | 7.54622E−02 | −3.25910E−02 | 2.55301E−03 | −3.09600E−04 | 1.32062E−03 | −2.30771E−03 |
| A12 = | −6.32797E−02 | 1.40930E−02 | 1.16139E−03 | | −1.78441E−04 | 2.59386E−04 |
| A14 = | 1.97277E−02 | −2.10381E−03 | −9.40821E−04 | | | −6.04842E−06 |
| A16 = | | | 1.24690E−04 | | | |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the $16^{th}$ order. All labels for Tables of the remaining embodiments share the same definitions as those in Table 1 and Table 2 of the first embodiment, and their definitions will not be stated again.

Figure 3:
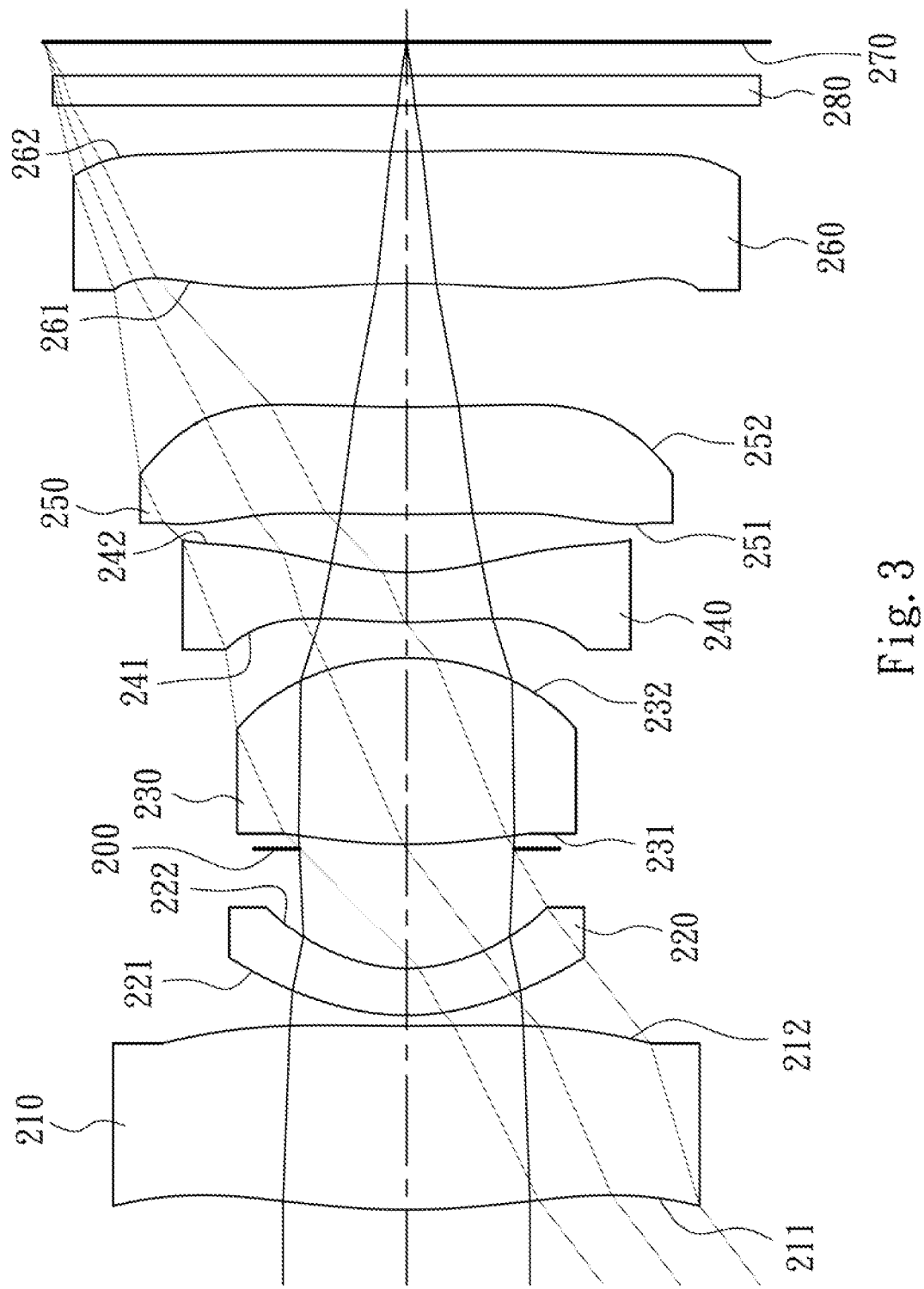
FIG. 3 is a schematic view of an image capturing lens assembly according to the second embodiment of the present disclosure.
Figure 4:
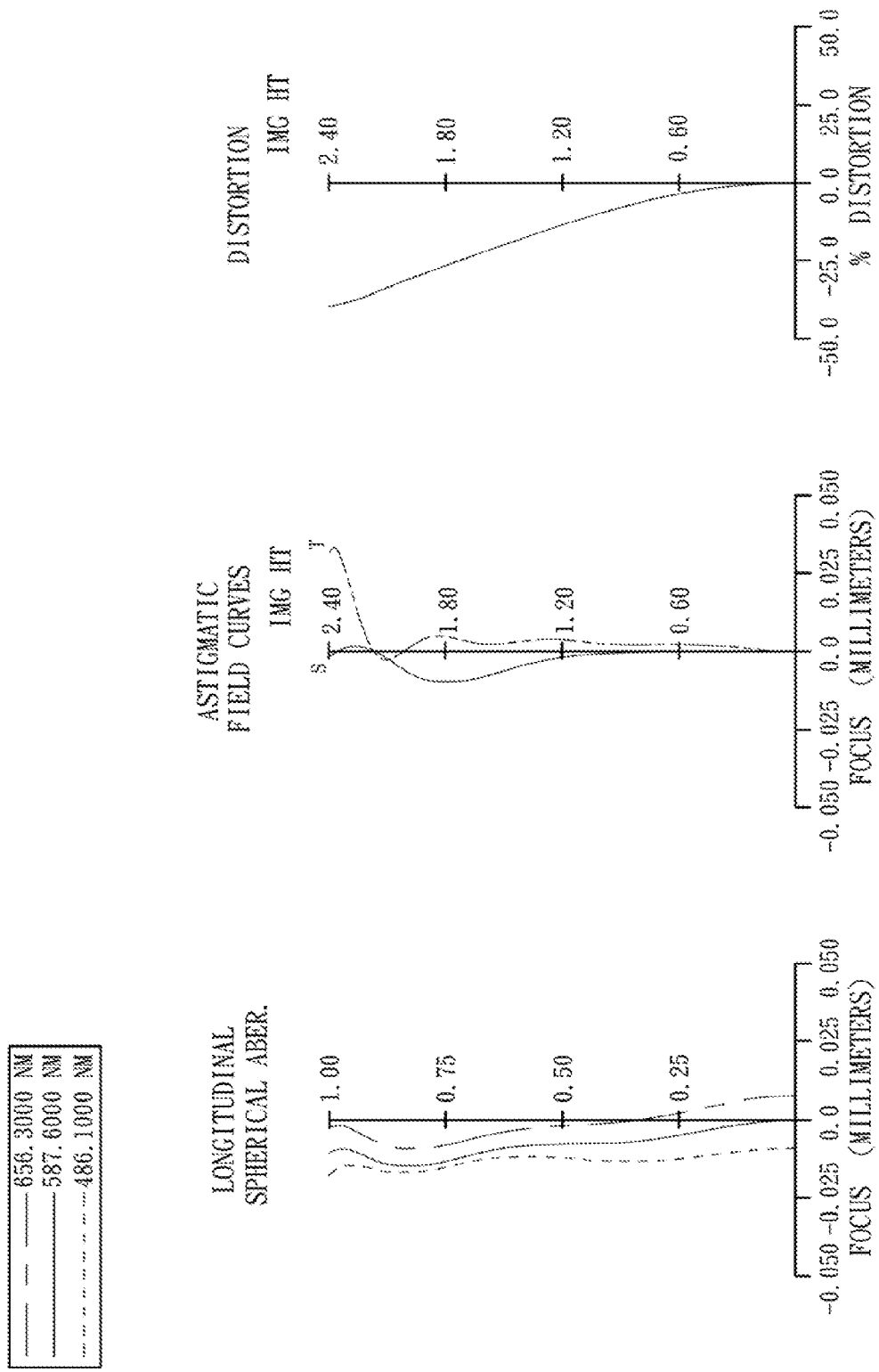
FIG. 4 shows spherical aberration curves, astigmatic field curves and distortion curve of the image capturing lens assembly according to the second embodiment of the present disclosure.

FIG. 3 is a schematic view of an image capturing lens assembly according to the second embodiment of the present disclosure. FIG. 4 shows spherical aberration curves, astigmatic field curves and distortion curve of the image capturing lens assembly according to the second embodiment of the present disclosure. In FIG. 3, the image capturing lens assembly includes, in order from an object side to an image side: the first lens element 210, the second lens element 220, an aperture stop 200, the third lens element 230, the fourth lens element 240, the fifth lens element 250, the sixth lens element 260, an IR (infrared) cut filter 280 and an image plane 270.

The first lens element 210 is made of plastic material. The first lens element 210 with positive refractive power has a convex object-side surface 211 and a concave image-side surface 212. The object-side surface 211 and the image-side surface 212 of the first lens element 210 are aspheric. The first lens element 210 has inflection points formed on the object-side surface 211 and the image-side surface 212 thereof.

The second lens element 220 is made of plastic material. The second lens element 220 with negative refractive power has a convex object-side surface 221 and a concave image-side surface 222. The object-side surface 221 and the image-side surface 222 of the second lens element 220 are aspheric.

The third lens element 230 is made of plastic material. The third lens element 230 with positive refractive power has a convex object-side surface 231 and a convex image-side surface 232. The object-side surface 231 and the image-side surface 232 of the third lens element 230 are aspheric.

The fourth lens element 240 is made of plastic material. The fourth lens element 240 with negative refractive power has a convex object-side surface 241 and a concave image-side surface 242. The object-side surface 241 and the image-side surface 242 of the fourth lens element 240 are aspheric. The fourth lens element 240 has inflection points formed on the object-side surface 241 and the image-side surface 242 thereof.

The fifth lens element 250 is made of plastic material. The fifth lens element 250 with negative refractive power has a convex object-side surface 251 and a concave image-side surface 252. The object-side surface 251 and the image-side surface 252 of the fifth lens element 250 are aspheric.

The sixth lens element 260 is made of plastic material. The sixth lens element 260 with negative refractive power has a concave object-side surface 261 and a concave image-side surface 262. The object-side surface 261 and the image-side surface 262 of the sixth lens element 260 are aspheric. The sixth lens element 260 has inflection points formed on the object-side surface 261 and the image-side surface 262 thereof.

The IR cut filter 280 is made of glass and is located between the sixth lens element 260 and the image plane 270, and will not affect the focal length of the image capturing lens assembly.

The equation of the aspheric surface profiles of the above lens elements of the second embodiment is the same as that of the first embodiment, and will not be stated herein again.

In the image capturing lens assembly according to the second embodiment, the definitions of f, Fno, HFOV, V2, V3, R1, R2, R3, R4, R5, R6, R7, R8, T12, T23, f1, f3, f6, DIST, SL, TTL and ImgH are the same as those stated in the first embodiment with corresponding values for the second embodiment, and they satisfy the following relationships:

| | |
|---|---|
| f(mm) | 5.22 |
| Fno | 3.20 |
| HFOV(deg.) | 37.3 |
| V3 − V2 | 29.0 |
| R1/R2 | 0.24 |
| (R3 − R4)/(R3 + R4) | 0.19 |
| (R5 + R6)/(R5 − R6) | 0.34 |
| R8/R7 | 0.50 |
| T12/T23 | 0.09 |
| f3/f1 | 0.22 |
| f/f3 | 2.05 |
| f/f6 | −0.77 |
| DIST(%) | −39.5 |
| SL/TTL | 0.69 |
| TTL/ImgH | 3.19 |

The detailed optical data of the second embodiment are shown in Table 3, and the aspheric surface data are shown in Table 4 as follows.

TABLE 3

2nd Embodiment
f = 5.22 mm, Fno = 3.20, HFOV = 37.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 4.847100 (ASP) | 1.213 | Plastic | 1.535 | 54.5 | 11.64 |
| 2 | | 20.000000 (ASP) | 0.070 | | | | |
| 3 | Lens 2 | 1.638160 (ASP) | 0.310 | Plastic | 1.614 | 25.5 | −7.22 |
| 4 | | 1.110300 (ASP) | 0.791 | | | | |
| 5 | Ape. Stop | Plano | 0.030 | | | | |
| 6 | Lens 3 | 3.818000 (ASP) | 1.235 | Plastic | 1.535 | 54.5 | 2.54 |
| 7 | | −1.872650 (ASP) | 0.233 | | | | |
| 8 | Lens 4 | 3.601300 (ASP) | 0.335 | Plastic | 1.614 | 25.5 | −6.33 |
| 9 | | 1.803750 (ASP) | 0.378 | | | | |
| 10 | Lens 5 | 14.115300 (ASP) | 0.711 | Plastic | 1.535 | 54.5 | −120.64 |
| 11 | | 11.377800 (ASP) | 0.819 | | | | |
| 12 | Lens 6 | −5.109700 (ASP) | 0.874 | Plastic | 1.535 | 54.5 | −6.78 |
| 13 | | 13.193100 (ASP) | 0.300 | | | | |
| 14 | IR-filter | Plano | 0.200 | Glass | 1.517 | 64.2 | — |
| 15 | | Plano | 0.225 | | | | |
| 16 | Image | Plano | — | | | | |

Note:
Reference wavelength (d-line) is 587.6 nm.

TABLE 4

Aspheric Coefficients

| Surface # | 1 | 2 | 3 | 4 | 6 | 7 |
|---|---|---|---|---|---|---|
| k = | 0.00000E+00 | 0.00000E+00 | 1.72069E−01 | −3.76271E−02 | −1.18997E−01 | −3.39293E−01 |
| A4 = | −2.41424E−02 | −4.67307E−02 | −6.62441E−02 | −9.12979E−02 | −1.81715E−02 | −8.93870E−02 |
| A6 = | −3.99273E−03 | 1.01768E−02 | 2.13785E−02 | −1.58489E−02 | −6.52198E−02 | 5.89713E−02 |
| A8 = | 6.19379E−04 | −1.17217E−03 | −4.33681E−03 | −1.86006E−02 | 1.74666E−01 | −4.59089E−02 |
| A10 = | 2.05162E−04 | 7.73292E−05 | 4.60860E−04 | 2.82746E−05 | −3.00923E−01 | 6.44005E−03 |
| A12 = | −4.65836E−05 | | | | 1.69418E−01 | |
| A14 = | 2.55117E−06 | | | | | |

TABLE 4-continued

Aspheric Coefficients

| Surface # | 8 | 9 | 10 | 11 | 12 | 13 |
|---|---|---|---|---|---|---|
| k = | 1.61172E+00 | 1.90904E−02 | −1.01986E+01 | −2.35592E+01 | 1.82047E+00 | −4.24978E+01 |
| A4 = | −2.26194E−01 | −1.69862E−01 | −3.33462E−02 | −1.38675E−02 | 8.12829E−02 | −4.86694E−02 |
| A6 = | 6.89033E−02 | 1.31541E−02 | −1.93250E−02 | −2.68007E−02 | −1.04530E−02 | 1.17801E−02 |
| A8 = | −6.66413E−02 | 3.24569E−02 | 5.63733E−02 | 4.71054E−03 | −3.21608E−03 | 4.56553E−03 |
| A10 = | 7.26142E−02 | −3.25691E−02 | 2.49639E−03 | −2.51649E−04 | 1.20346E−03 | −2.25382E−03 |
| A12 = | −6.28448E−02 | 1.38950E−02 | 1.15196E−03 | | −1.73205E−04 | 2.66067E−04 |
| A14 = | 2.02292E−02 | −2.19453E−03 | −9.34484E−04 | | | −7.21472E−06 |
| A16 = | | | | 1.24690E−04 | | |

Figure 5:
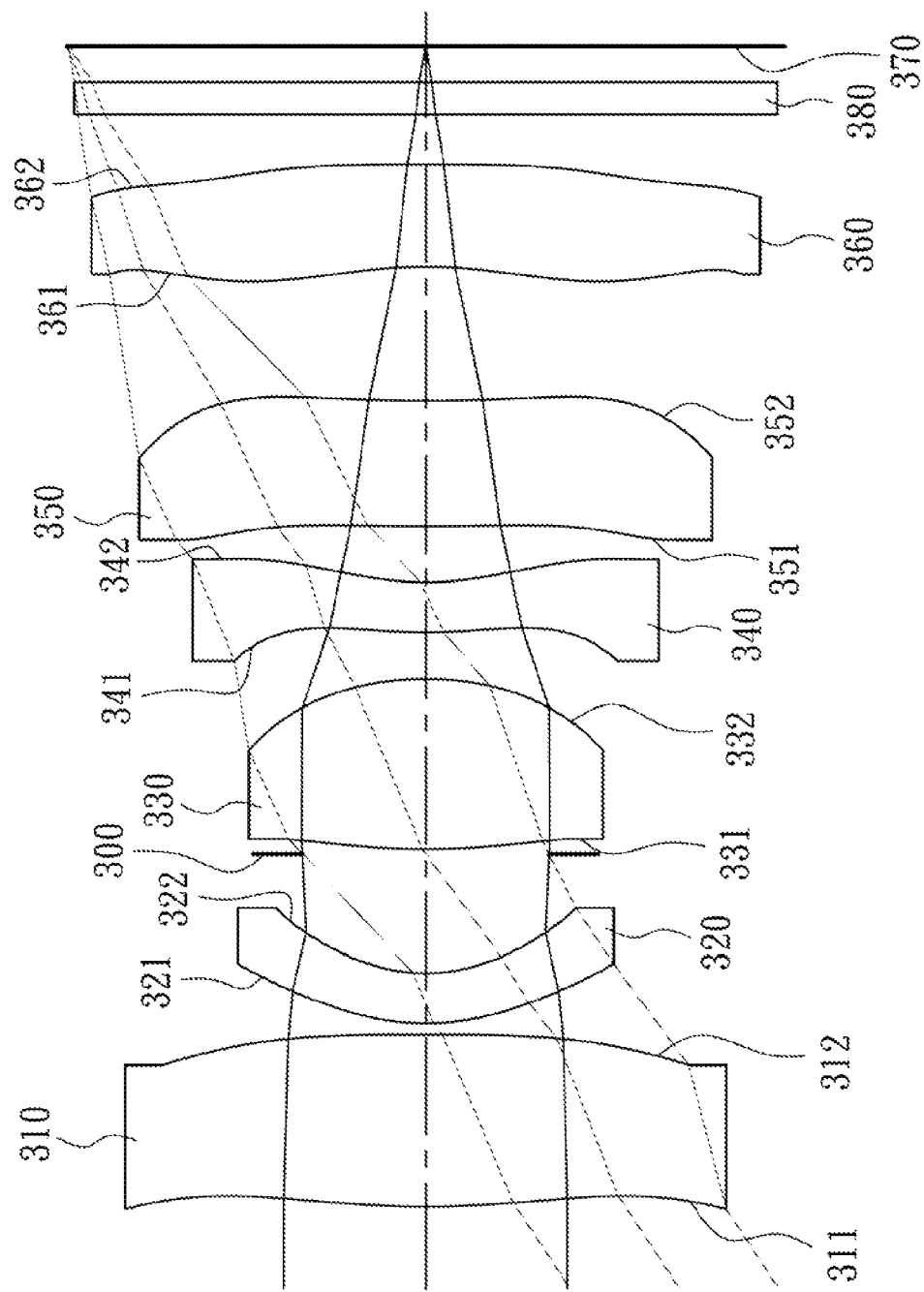
FIG. 5 is a schematic view of an image capturing lens assembly according to the third embodiment of the present disclosure.
Figure 6:
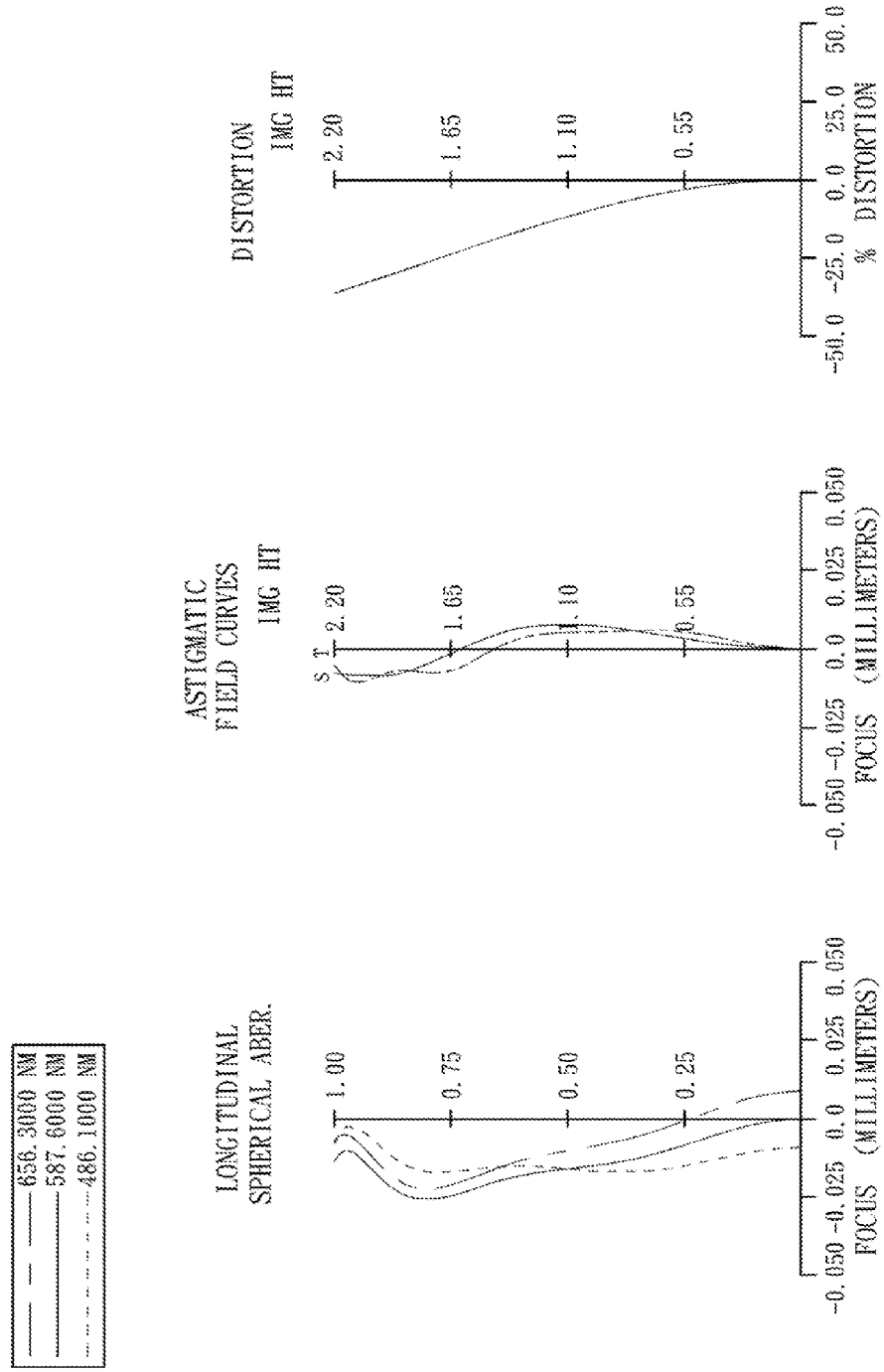
FIG. 6 shows spherical aberration curves, astigmatic field curves and distortion curve of the image capturing lens assembly according to the third embodiment of the present disclosure.

FIG. 5 is a schematic view of an image capturing lens assembly according to the third embodiment of the present disclosure. FIG. 6 shows spherical aberration curves, astigmatic field curves and distortion curve of the image capturing lens assembly according to the third embodiment of the present disclosure. In FIG. 5, the image capturing lens assembly includes, in order from an object side to an image side: the first lens element 310, the second lens element 320, an aperture stop 300, the third lens element 330, the fourth lens element 340, the fifth lens element 350, the sixth lens element 360, an IR (infrared) cut filter 380 and an image plane 370.

The first lens element 310 is made of plastic material. The first lens element 310 with positive refractive power has a convex object-side surface 311 and a convex image-side surface 312. The object-side surface 311 and the image-side surface 312 of the first lens element 310 are aspheric. The first lens element 310 has inflection points formed on the object-side surface 311 and the image-side surface 312 thereof.

The second lens element 320 is made of plastic material. The second lens element 320 with negative refractive power has a convex object-side surface 321 and a concave image-side surface 322. The object-side surface 321 and the image-side surface 322 of the second lens element 320 are aspheric.

The third lens element 330 is made of plastic material. The third lens element 330 with positive refractive power has a convex object-side surface 331 and a convex image-side surface 332. The object-side surface 331 and the image-side surface 332 of the third lens element 330 are aspheric.

The fourth lens element 340 is made of plastic material. The fourth lens element 340 with negative refractive power has a convex object-side surface 341 and a concave image-side surface 342. The object-side surface 341 and the image-side surface 342 of the fourth lens element 340 are aspheric. The fourth lens element 340 has inflection points formed on the object-side surface 341 and the image-side surface 342 thereof.

The fifth lens element 350 is made of plastic material. The fifth lens element 350 with negative refractive power has a convex object-side surface 351 and a concave image-side surface 352. The object-side surface 351 and the image-side surface 352 of the fifth lens element 350 are aspheric.

The sixth lens element 360 is made of plastic material. The sixth lens element 360 with negative refractive power has a concave object-side surface 361 and a convex image-side surface 362. The object-side surface 361 and the image-side surface 362 of the sixth lens element 360 are aspheric. The sixth lens element 360 has inflection points formed on the object-side surface 361 and the image-side surface 362 thereof.

The IR cut filter 380 is made of glass and is located between the sixth lens element 360 and the image plane 370, and will not affect the focal length of the image capturing lens assembly.

The equation of the aspheric surface profiles of the above lens elements of the third embodiment is the same as that of the first embodiment, and will not be stated herein again.

In the image capturing lens assembly according to the third embodiment, the definitions of f, Fno, HFOV, V2, V3, R1, R2, R3, R4, R5, R6, R7, R8, T12, T23, f1, f3, f6, DIST, SL, TTL and ImgH are the same as those stated in the first embodiment with corresponding values for the third embodiment, and they satisfy the following relationships:

| | |
|---|---|
| f(mm) | 5.22 |
| Fno | 3.00 |
| HFOV(deg.) | 33.5 |
| V3 − V2 | 34.9 |
| R1/R2 | −0.12 |
| (R3 − R4)/(R3 + R4) | 0.17 |
| (R5 + R6)/(R5 − R6) | 0.38 |
| R8/R7 | 0.59 |
| T12/T23 | 0.09 |
| f3/f1 | 0.29 |
| f/f3 | 1.87 |
| f/f6 | −0.95 |
| DIST(%) | −36.2 |
| SL/TTL | 0.69 |
| TTL/ImgH | 3.21 |

The detailed optical data of the third embodiment are shown in Table 5, and the aspheric surface data are shown in Table 6 as follows.

TABLE 5

3rd Embodiment
f = 5.22 mm, Fno = 3.00, HFOV = 33.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 5.668008 (ASP) | 1.056 | Plastic | 1.535 | 56.3 | 9.53 |
| 2 | | −47.172124 (ASP) | 0.070 | | | | |
| 3 | Lens 2 | 1.506234 (ASP) | 0.310 | Plastic | 1.650 | 21.4 | −7.73 |
| 4 | | 1.064690 (ASP) | 0.734 | | | | |

TABLE 5-continued

3rd Embodiment
f = 5.22 mm, Fno = 3.00, HFOV = 33.5 deg.

| Surface # | | Curvature Radius | Thickness | Material | Index | Abbe # | Focal length |
|---|---|---|---|---|---|---|---|
| 5 | Ape. Stop | Plano | 0.030 | | | | |
| 6 | Lens 3 | 4.542792 (ASP) | 1.039 | Plastic | 1.535 | 56.3 | 2.79 |
| 7 | | −2.045953 (ASP) | 0.288 | | | | |
| 8 | Lens 4 | 3.196435 (ASP) | 0.310 | Plastic | 1.614 | 25.6 | −8.35 |
| 9 | | 1.896690 (ASP) | 0.342 | | | | |
| 10 | Lens 5 | 15.498349 (ASP) | 0.770 | Plastic | 1.535 | 56.3 | −58.11 |
| 11 | | 10.160607 (ASP) | 0.827 | | | | |
| 12 | Lens 6 | −2.811467 (ASP) | 0.630 | Plastic | 1.535 | 56.3 | −5.50 |
| 13 | | −68.890140 (ASP) | 0.300 | | | | |
| 14 | IR-filter | Plano | 0.200 | Glass | 1.517 | 64.2 | — |
| 15 | | Plano | 0.224 | | | | |
| 16 | Image | Plano | — | | | | |

Note:
Reference wavelength (d-line) is 587.6 nm.

TABLE 6

Aspheric Coefficients

| Surface # | 1 | 2 | 3 | 4 | 6 | 7 |
|---|---|---|---|---|---|---|
| k = | 0.00000E+00 | 0.00000E+00 | 0.00000E+00 | 0.00000E+00 | 0.00000E+00 | 0.00000E+00 |
| A4 = | −2.64969E−02 | −4.30098E−02 | −8.55147E−02 | −1.34186E−01 | −1.49000E−02 | −1.08170E−01 |
| A6 = | −3.63310E−03 | 1.02587E−02 | −8.91134E−03 | −3.72315E−02 | −6.94790E−02 | 6.57941E−02 |
| A8 = | 6.50121E−04 | −1.34771E−03 | −2.60563E−03 | −2.23090E−02 | 1.89841E−01 | −4.63266E−02 |
| A10 = | 2.16581E−04 | 1.18975E−04 | 2.52782E−03 | −5.08346E−03 | −3.05138E−01 | 4.85675E−03 |
| A12 = | −4.63869E−05 | | | | 1.61554E−01 | |
| A14 = | 2.23656E−06 | | | | | |

| Surface # | 8 | 9 | 10 | 11 | 12 | 13 |
|---|---|---|---|---|---|---|
| k = | 0.00000E+00 | | −5.00000E+01 | 2.61840E+00 | −3.67136E−01 | −5.00000E+01 |
| A4 = | −2.43843E−01 | −1.74953E−01 | −3.34455E−02 | −6.99232E−03 | 1.08629E−01 | −5.68323E−02 |
| A6 = | 6.44345E−02 | 1.28569E−02 | −2.00653E−02 | −2.67698E−02 | −1.29231E−02 | 1.46522E−02 |
| A8 = | −6.28281E−03 | 3.25980E−02 | 5.62847E−03 | 4.60271E−03 | −3.42603E−03 | 4.76532E−03 |
| A10 = | 7.35856E−02 | −3.24794E−02 | 2.50584E−03 | −2.50742E−04 | 1.31684E−03 | −2.31643E−03 |
| A12 = | −6.40592E−02 | 1.40581E−02 | 1.16724E−03 | | −1.66489E−04 | 2.59292E−04 |
| A14 = | 2.08387E−02 | −2.18945E−03 | −9.33084E−04 | | | −5.99517E−06 |
| A16 = | | | 1.24690E−04 | | | |

Figure 7:
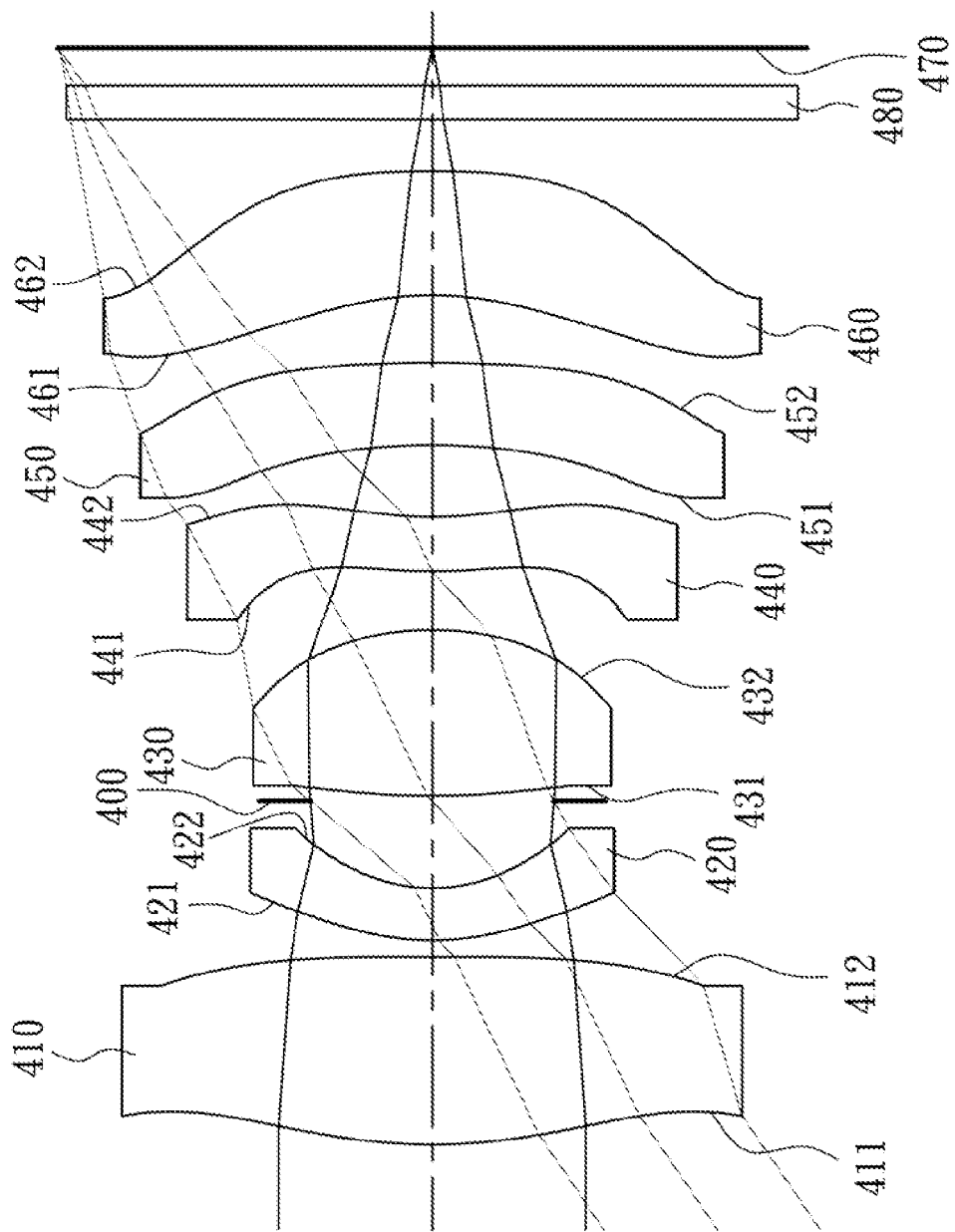
FIG. 7 is a schematic view of an image capturing lens assembly according to the fourth embodiment of the present disclosure.
Figure 8:
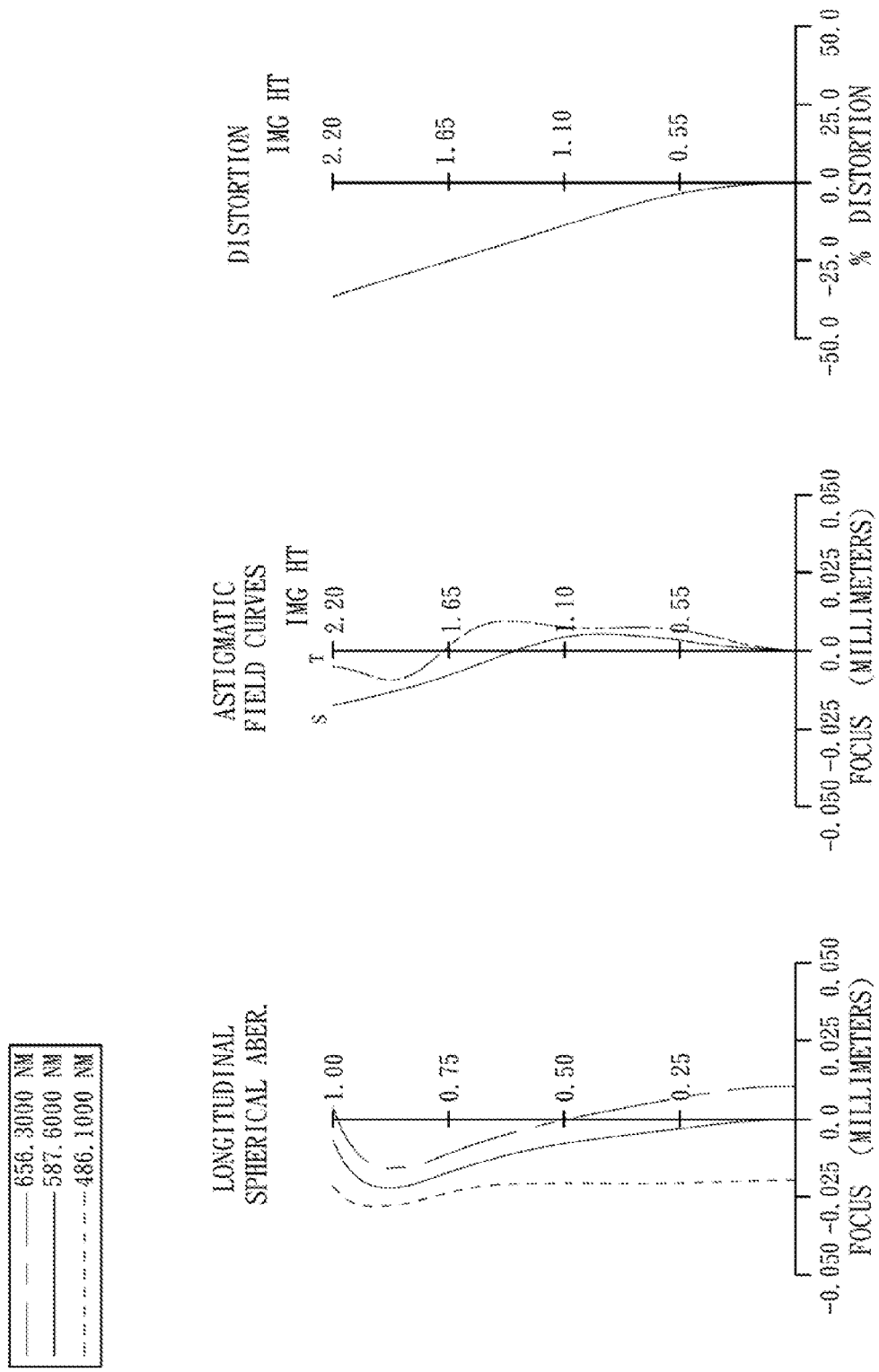
FIG. 8 shows spherical aberration curves, astigmatic field curves and distortion curve of the image capturing lens assembly according to the fourth embodiment of the present disclosure.

FIG. 7 is a schematic view of an image capturing lens assembly according to the fourth embodiment of the present disclosure. FIG. 8 shows spherical aberration curves, astigmatic field curves and distortion curve of the image capturing lens assembly according to the fourth embodiment of the present disclosure. In FIG. 7, the image capturing lens assembly includes, in order from an object side to an image side: the first lens element 410, the second lens element 420, an aperture stop 400, the third lens element 430, the fourth lens element 440, the fifth lens element 450, the sixth lens element 460, an IR (infrared) cut filter 480 and an image plane 470.

The first lens element 410 is made of plastic material. The first lens element 410 with positive refractive power has a convex object-side surface 411 and a concave image-side surface 412. The object-side surface 411 and the image-side surface 412 of the first lens element 410 are aspheric. The first lens element 410 has inflection points formed on the object-side surface 411 and the image-side surface 412 thereof.

The second lens element 420 is made of plastic material. The second lens element 420 with negative refractive power has a convex object-side surface 421 and a concave image-side surface 422. The object-side surface 421 and the image-side surface 422 of the second lens element 420 are aspheric.

The third lens element 430 is made of plastic material. The third lens element 430 with positive refractive power has a convex object-side surface 431 and a convex image-side surface 432. The object-side surface 431 and the image-side surface 432 of the third lens element 430 are aspheric.

The fourth lens element 440 is made of plastic material. The fourth lens element 440 with negative refractive power has a convex object-side surface 441 and a concave image-side surface 442. The object-side surface 441 and the image-side surface 442 of the fourth lens element 440 are aspheric. The fourth lens element 440 has inflection points formed on the object-side surface 441 and the image-side surface 442 thereof.

The fifth lens element 450 is made of plastic material. The fifth lens element 450 with negative refractive power has a concave object-side surface 451 and a convex image-side surface 452. The object-side surface 451 and the image-side surface 452 of the fifth lens element 450 are aspheric.

The sixth lens element 460 is made of plastic material. The sixth lens element 460 with negative refractive power has a concave object-side surface 461 and a convex image-side surface 462. The object-side surface 461 and the image-side surface 462 of the sixth lens element 460 are aspheric. The sixth lens element 460 has inflection points formed on the object-side surface 461 and the image-side surface 462 thereof.

The IR cut filter 480 is made of glass and is located between the sixth lens element 460 and the image plane 470, and will not affect the focal length of the image capturing lens assembly.

The equation of the aspheric surface profiles of the above lens elements of the fourth embodiment is the same as that of the first embodiment, and will not be stated herein again.

In the image capturing lens assembly according to the fourth embodiment, the definitions of f, Fno, HFOV, V2, V3, R1, R2, R3, R4, R5, R6, R7, R8, T12, T23, f1, f3, f6, DIST, SL, TTL and ImgH are the same as those stated in the first embodiment with corresponding values for the fourth embodiment, and they satisfy the following relationships:

| | |
|---|---|
| f(mm) | 5.04 |
| Fno | 2.80 |
| HFOV(deg.) | 34.5 |
| V3 − V2 | 30.3 |
| R1/R2 | 0.01 |
| (R3 − R4)/(R3 + R4) | 0.24 |
| (R5 + R6)/(R5 − R6) | 0.44 |
| R8/R7 | 0.75 |
| T12/T23 | 0.19 |
| f3/f1 | 0.44 |
| f/f3 | 1.92 |
| f/f6 | −0.93 |
| DIST(%) | −36.5 |
| SL/TTL | 0.68 |
| TTL/ImgH | 2.90 |

The detailed optical data of the fourth embodiment are shown in Table 7, and the aspheric surface data are shown in Table 8 as follows.

TABLE 7

4th Embodiment
f = 5.04 mm, Fno = 2.80, HFOV = 34.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 3.245800 (ASP) | 1.101 | Plastic | 1.544 | 55.9 | 6.03 |
| 2 | | 273.384100 (ASP) | 0.100 | | | | |
| 3 | Lens 2 | 1.607490 (ASP) | 0.310 | Plastic | 1.614 | 25.6 | −5.02 |
| 4 | | 0.979300 (ASP) | 0.509 | | | | |
| 5 | Ape. Stop | Plano | 0.030 | | | | |
| 6 | Lens 3 | 4.828000 (ASP) | 0.979 | Plastic | 1.544 | 55.9 | 2.62 |
| 7 | | −1.881610 (ASP) | 0.343 | | | | |
| 8 | Lens 4 | 3.196900 (ASP) | 0.322 | Plastic | 1.633 | 23.4 | −17.54 |
| 9 | | 2.385200 (ASP) | 0.418 | | | | |
| 10 | Lens 5 | −3.904200 (ASP) | 0.485 | Plastic | 1.544 | 55.9 | −14.41 |
| 11 | | −8.118300 (ASP) | 0.400 | | | | |
| 12 | Lens 6 | −1.874170 (ASP) | 0.730 | Plastic | 1.544 | 55.9 | −5.44 |
| 13 | | −5.804200 (ASP) | 0.300 | | | | |
| 14 | IR-filter | Plano | 0.200 | Glass | 1.517 | 64.2 | — |
| 15 | | Plano | 0.225 | | | | |
| 16 | Image | Plano | — | | | | |

Note:
Reference wavelength (d-line) is 587.6 nm.

TABLE 8

Aspheric Coefficients

| Surface # | 1 | 2 | 3 | 4 | 6 | 7 |
|---|---|---|---|---|---|---|
| k = | −1.33024E+00 | −5.00000E+01 | −1.43756E−01 | 1.71062E−01 | 9.36006E+00 | −2.45865E−02 |
| A4 = | −2.02896E−02 | −4.28300E−02 | −7.63590E−02 | −1.42177E−01 | −1.35501E−02 | −1.44913E−01 |
| A6 = | −4.38541E−03 | 8.89208E−03 | −1.75774E−02 | −1.17586E−01 | −7.70599E−02 | 8.38400E−02 |
| A8 = | −3.26406E−04 | −1.33781E−03 | −4.95405E−05 | 1.28007E−02 | 1.74582E−01 | −6.54537E−02 |
| A10 = | 2.85545E−04 | 1.34124E−04 | 5.70481E−03 | −1.05703E−01 | −2.82866E−01 | 8.26502E−03 |
| A12 = | −1.34145E−05 | | | | 1.69420E−01 | |
| A14 = | −1.39966E−06 | | | | | |

| Surface # | 8 | 9 | 10 | 11 | 12 | 13 |
|---|---|---|---|---|---|---|
| k = | −1.69760E+00 | 4.32366E−02 | 3.99646E−01 | 5.80682E+00 | −3.37927E−01 | −3.93931E+01 |
| A4 = | −2.93615E−01 | −1.81535E−01 | −1.42207E−02 | 3.13577E−03 | 9.18511E−02 | −1.41491E−01 |
| A6 = | 6.06804E−02 | 1.24493E−02 | −1.55490E−02 | −3.02367E−02 | −2.06265E−02 | 2.76226E−02 |
| A8 = | −8.18009E−02 | 3.29388E−02 | 5.81608E−03 | 7.35801E−03 | 4.72310E−03 | 3.27363E−03 |
| A10 = | 7.75517E−02 | −3.25519E−02 | 2.50095E−03 | −1.41708E−04 | −2.10654E−04 | −1.97501E−03 |
| A12 = | −6.96872E−02 | 1.40937E−02 | 1.13271E−03 | | −6.22720E−06 | 3.94301E−04 |
| A14 = | 2.70377E−02 | −2.08534E−03 | −9.64197E−04 | | | −2.86065E−05 |
| A16 = | | | 1.36315E−04 | | | |

Figure 9:
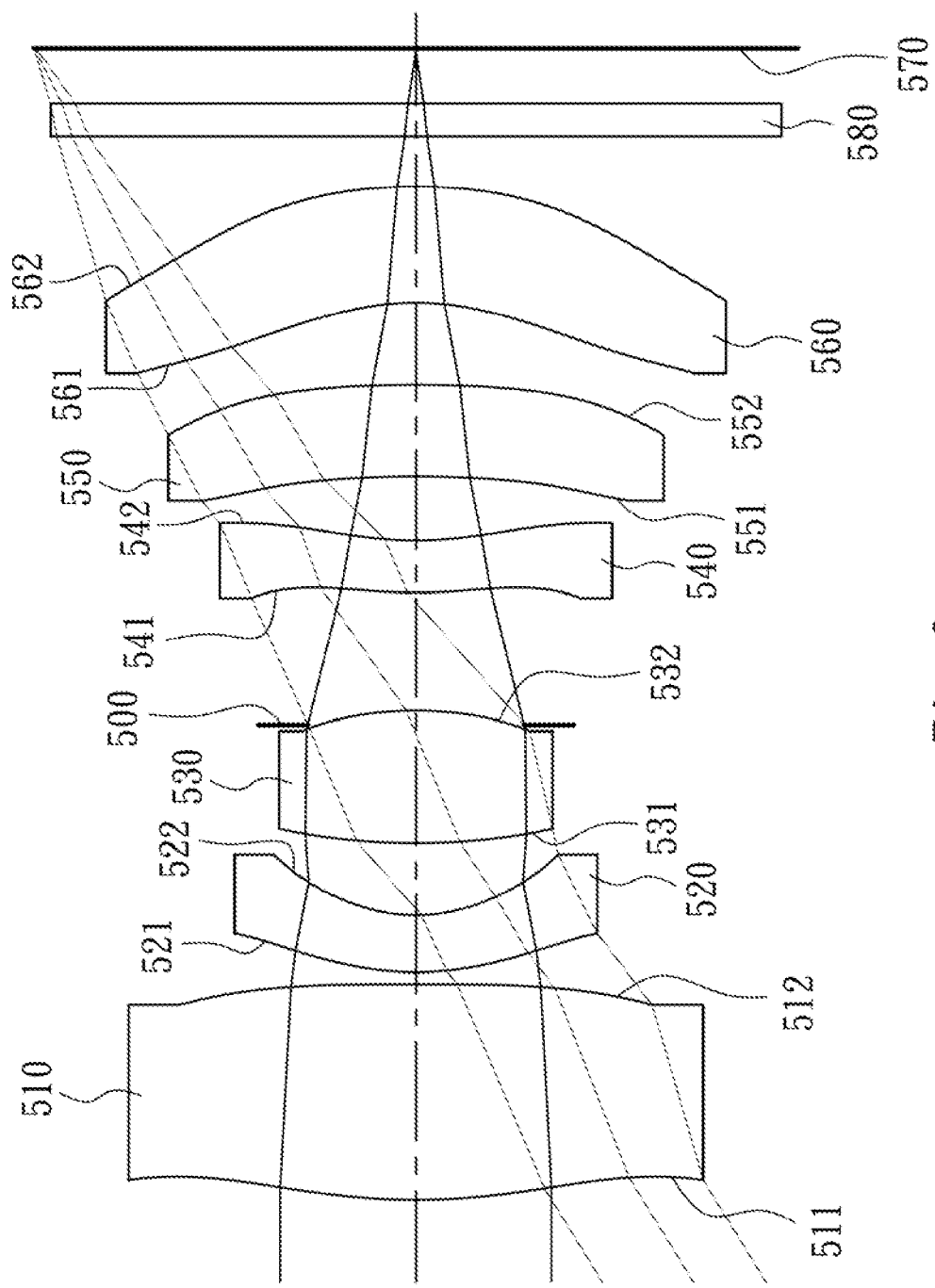
FIG. 9 is a schematic view of an image capturing lens assembly according to the fifth embodiment of the present disclosure.
Figure 10:
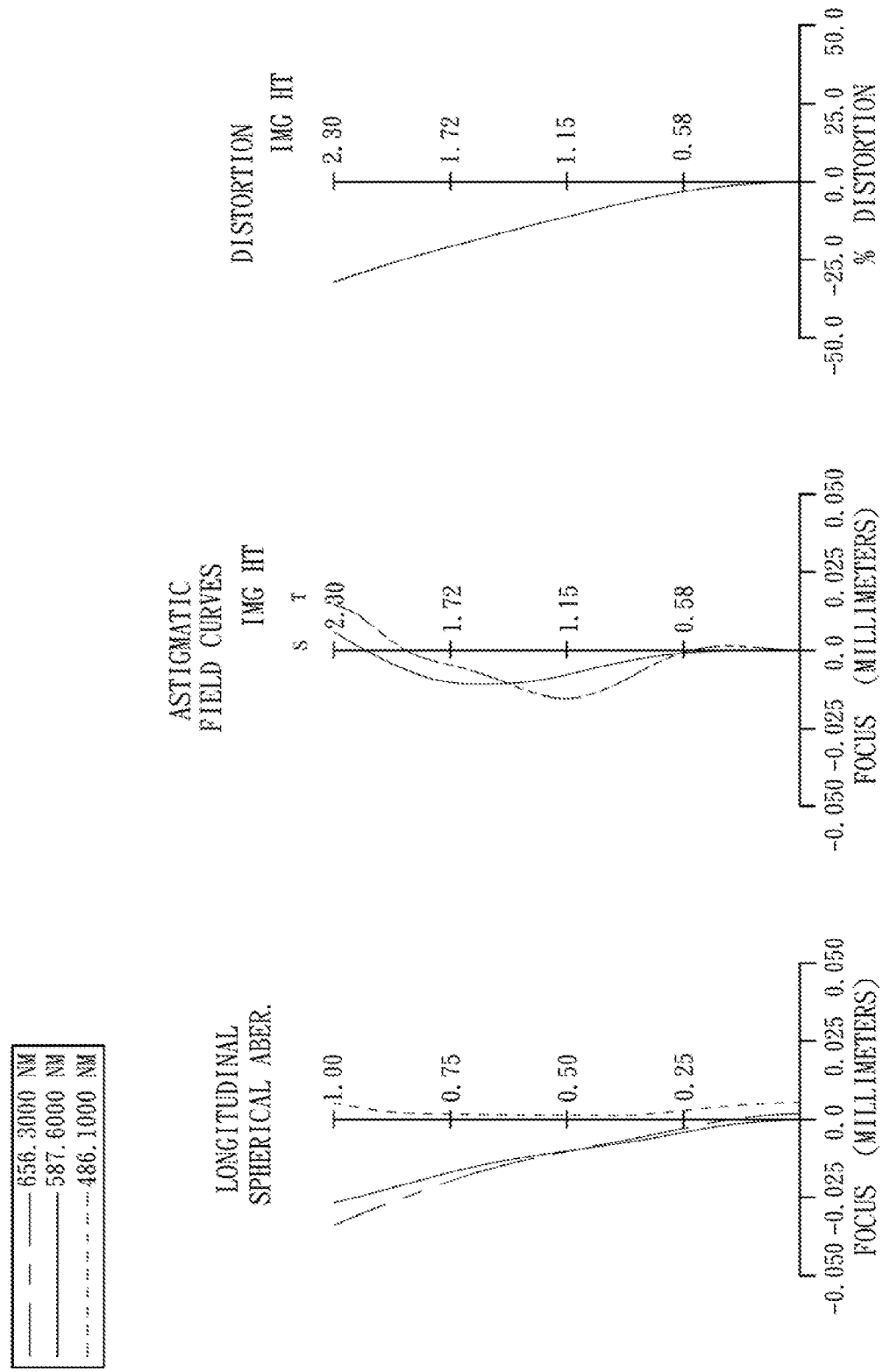
FIG. 10 shows spherical aberration curves, astigmatic field curves and distortion curve of the image capturing lens assembly according to the fifth embodiment of the present disclosure.

FIG. 9 is a schematic view of an image capturing lens assembly according to the fifth embodiment of the present disclosure. FIG. 10 shows spherical aberration curves, astigmatic field curves and distortion curve of the image capturing lens assembly according to the fifth embodiment of the present disclosure. In FIG. 9, the image capturing lens assembly includes, in order from an object side to an image side: the first lens element 510, the second lens element 520, the third lens element 530, an aperture stop 500, the fourth lens element 540, the fifth lens element 550, the sixth lens element 560, an IR (infrared) cut filter 580 and an image plane 570.

The first lens element 510 is made of plastic material. The first lens element 510 with positive refractive power has a convex object-side surface 511 and a convex image-side surface 512. The object-side surface 511 and the image-side surface 512 of the first lens element 510 are aspheric. The first lens element 510 has inflection points formed on the object-side surface 511 and the image-side surface 512 thereof.

The second lens element 520 is made of plastic material. The second lens element 520 with negative refractive power has a convex object-side surface 521 and a concave image-side surface 522. The object-side surface 521 and the image-side surface 522 of the second lens element 520 are aspheric.

The third lens element 530 is made of plastic material. The third lens element 530 with positive refractive power has a convex object-side surface 531 and a convex image-side surface 532. The object-side surface 531 and the image-side surface 532 of the third lens element 530 are aspheric.

The fourth lens element 540 is made of plastic material. The fourth lens element 540 with negative refractive power has a convex object-side surface 541 and a concave image-side surface 542. The object-side surface 541 and the image-side surface 542 of the fourth lens element 540 are aspheric. The fourth lens element 540 has inflection points formed on the object-side surface 541 and the image-side surface 542 thereof.

The fifth lens element 550 is made of plastic material. The fifth lens element 550 with negative refractive power has a concave object-side surface 551 and a convex image-side surface 552. The object-side surface 551 and the image-side surface 552 of the fifth lens element 550 are aspheric. The fifth lens element 550 has inflection points formed on the object-side surface 551 thereof.

The sixth lens element 560 is made of plastic material. The sixth lens element 560 with negative refractive power has a concave object-side surface 561 and a convex image-side surface 562. The object-side surface 561 and the image-side surface 562 of the sixth lens element 560 are aspheric. The sixth lens element 560 has inflection points formed on the object-side surface 561 and the image-side surface 562 thereof.

The IR cut filter 580 is made of glass and is located between the sixth lens element 560 and the image plane 570, and will not affect the focal length of the image capturing lens assembly.

The equation of the aspheric surface profiles of the above lens elements of the fifth embodiment is the same as that of the first embodiment, and will not be stated herein again.

In the image capturing lens assembly according to the fifth embodiment, the definitions of f, Fno, HFOV, V2, V3, R1, R2, R3, R4, R5, R6, R7, R8, T12, T23, f1, f3, f6, DIST, SL, TTL and ImgH are the same as those stated in the first embodiment with corresponding values for the fifth embodiment, and they satisfy the following relationships:

| | |
|---|---|
| f(mm) | 5.56 |
| Fno | 3.40 |
| HFOV(deg.) | 31.4 |
| V3 − V2 | 33.1 |
| R1/R2 | −0.02 |
| (R3 − R4)/(R3 + R4) | 0.28 |
| (R5 + R6)/(R5 − R6) | 0.23 |
| R8/R7 | 0.68 |
| T12/T23 | 0.17 |
| f3/f1 | 0.40 |
| f/f3 | 2.03 |
| f/f6 | −0.73 |
| DIST(%) | −32.2 |
| SL/TTL | 0.58 |
| TTL/ImgH | 2.99 |

The detailed optical data of the fifth embodiment are shown in Table 9, and the aspheric surface data are shown in Table 10 as follows.

TABLE 9

5th Embodiment
f = 5.56 mm, Fno = 3.40, HFOV = 31.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 3.799500 (ASP) | 1.300 | Plastic | 1.543 | 56.5 | 6.86 |
| 2 | | −168.803900 (ASP) | 0.072 | | | | |
| 3 | Lens 2 | 1.842350 (ASP) | 0.344 | Plastic | 1.633 | 23.4 | −4.48 |
| 4 | | 1.035670 (ASP) | 0.433 | | | | |
| 5 | Lens 3 | 3.700100 (ASP) | 0.801 | Plastic | 1.543 | 56.5 | 2.74 |
| 6 | | −2.298830 (ASP) | −0.083 | | | | |
| 7 | Ape. Stop | Plano | 0.797 | | | | |
| 8 | Lens 4 | 3.214000 (ASP) | 0.313 | Plastic | 1.633 | 23.4 | −12.44 |
| 9 | | 2.196020 (ASP) | 0.389 | | | | |
| 10 | Lens 5 | −7.148600 (ASP) | 0.550 | Plastic | 1.543 | 56.5 | −902.92 |
| 11 | | −7.450800 (ASP) | 0.498 | | | | |
| 12 | Lens 6 | −1.625220 (ASP) | 0.700 | Plastic | 1.535 | 56.3 | −7.58 |
| 13 | | −3.120700 (ASP) | 0.300 | | | | |
| 14 | IR-filter | Plano | 0.200 | Glass | 1.517 | 64.2 | — |
| 15 | | Plano | 0.336 | | | | |
| 16 | Image | Plano | — | | | | |

Note:
Reference wavelength (d-line) is 587.6 nm.

TABLE 10

Aspheric Coefficients

| Surface # | 1 | 2 | 3 | 4 | 5 | 6 |
|---|---|---|---|---|---|---|
| k = | −1.78207E+00 | 2.07088E+01 | −3.95486E−02 | 1.06476E−01 | 2.55284E+00 | −2.40679E+00 |
| A4 = | −2.19812E−02 | −4.37846E−02 | −7.12648E−02 | −1.38300E−01 | −3.13721E−02 | −1.09220E−01 |
| A6 = | −4.61785E−03 | 8.76649E−03 | −4.90498E−03 | −7.84759E−02 | −4.63130E−02 | 2.27852E−02 |
| A8 = | 1.99133E−05 | −8.60805E−04 | 5.22638E−03 | 6.57157E−02 | 1.86286E−01 | −1.71297E−02 |
| A10 = | 3.27875E−04 | 1.18858E−04 | −1.03347E−02 | −1.03014E−01 | −2.44232E−01 | 4.40879E−03 |
| A12 = | −1.50194E−05 | | | | 1.69420E−01 | |
| A14 = | −3.79020E−06 | | | | | |

| Surface # | 8 | 9 | 10 | 11 | 12 | 13 |
|---|---|---|---|---|---|---|
| k = | 5.40005E+00 | 5.47247E−01 | −1.19165E+00 | 6.93312E+00 | −3.62280E−01 | −1.26944E+01 |
| A4 = | −2.32848E−01 | −1.71636E−01 | −1.48136E−02 | −4.06792E−03 | 1.09658E−01 | −9.65406E−02 |
| A6 = | 1.04631E−02 | 1.36403E−02 | −1.48872E−02 | −2.67028E−02 | −1.77479E−02 | 2.46331E−02 |
| A8 = | −3.25399E−02 | 3.38555E−02 | 6.85556E−03 | 7.66040E−03 | 4.63129E−03 | 2.55174E−03 |
| A10 = | 6.77250E−02 | −3.16638E−02 | 2.61209E−03 | −2.17598E−04 | −3.48722E−04 | −2.06257E−03 |
| A12 = | −6.95135E−02 | 1.39916E−02 | 1.11241E−03 | | −4.94294E−05 | 3.76375E−04 |
| A14 = | 2.67203E−02 | −2.48810E−03 | −1.01343E−03 | | | −3.33796E−05 |
| A16 = | | | 8.84572E−05 | | | |

Figure 11:
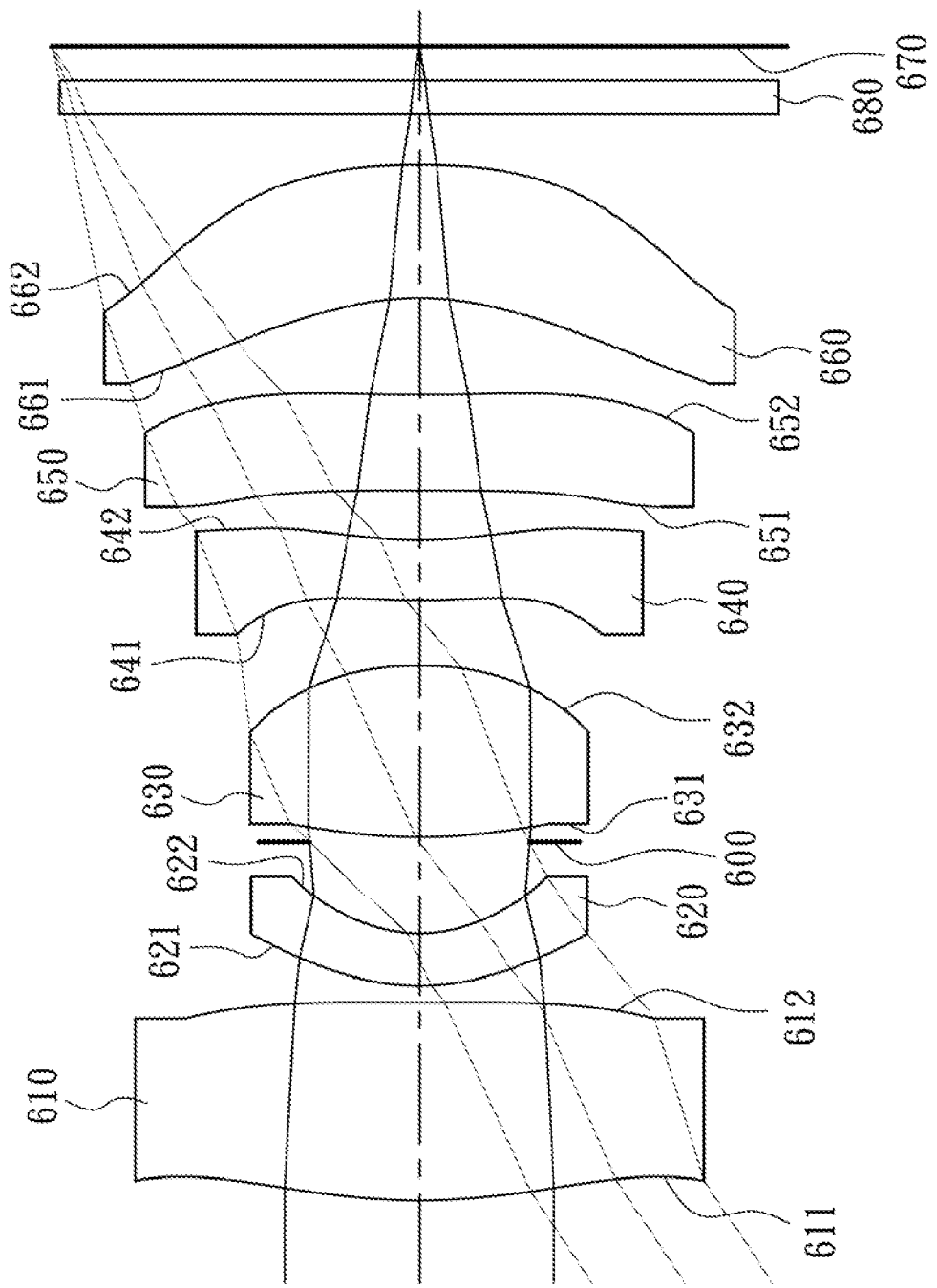
FIG. 11 is a schematic view of an image capturing lens assembly according to the sixth embodiment of the present disclosure.
Figure 12:
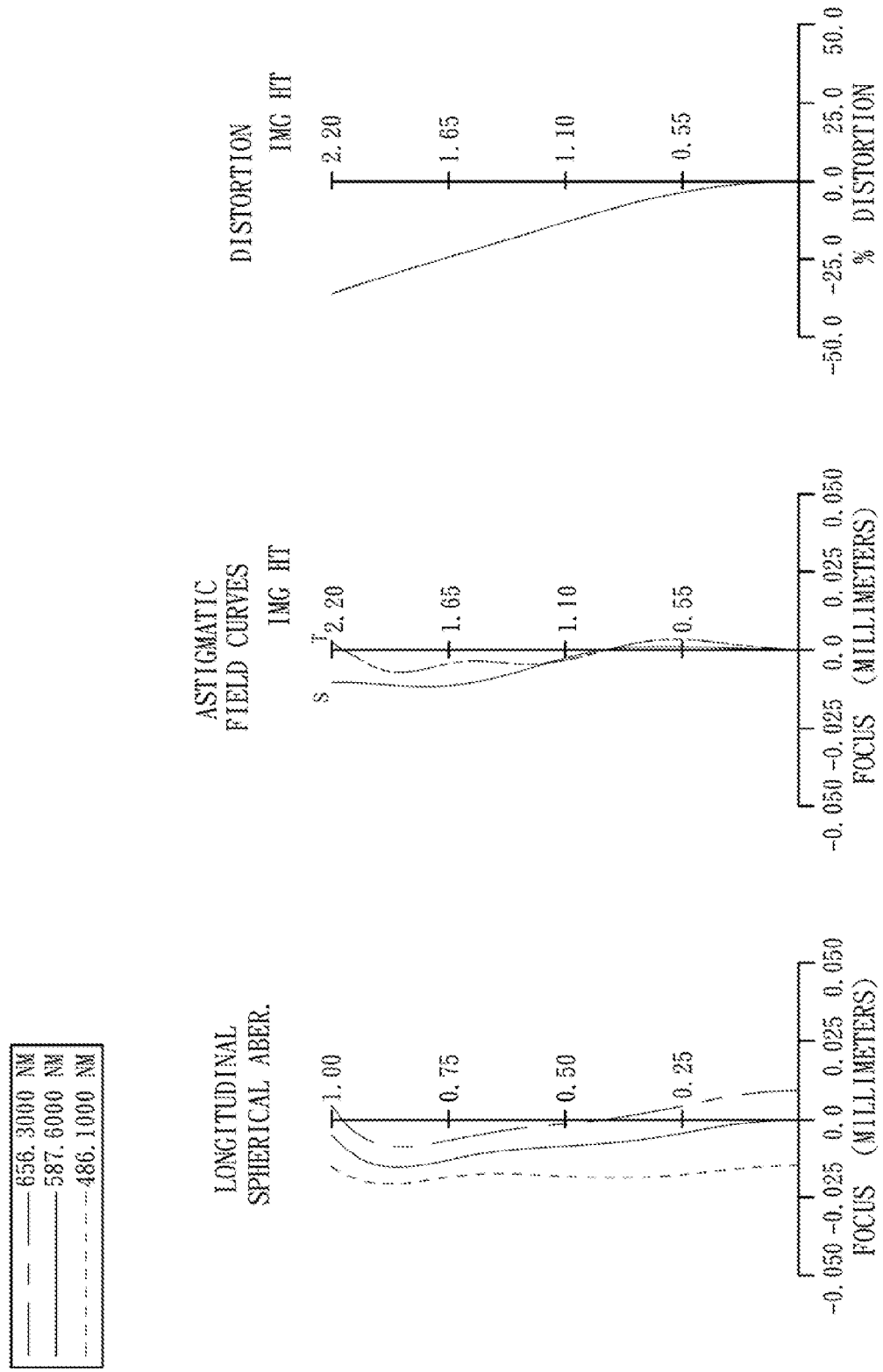
FIG. 12 shows spherical aberration curves, astigmatic field curves and distortion curve of the image capturing lens assembly according to the sixth embodiment of the present disclosure.

FIG. 11 is a schematic view of an image capturing lens assembly according to the sixth embodiment of the present disclosure. FIG. 12 shows spherical aberration curves, astigmatic field curves and distortion curve of the image capturing lens assembly according to the sixth embodiment of the present disclosure. In FIG. 11, the image capturing lens assembly includes, in order from an object side to an image side: the first lens element 610, the second lens element 620, an aperture stop 600, the third lens element 630, the fourth lens element 640, the fifth lens element 650, the sixth lens element 660, an IR (infrared) cut filter 680 and an image plane 670.

The first lens element 610 is made of plastic material. The first lens element 610 with positive refractive power has a convex object-side surface 611 and a concave image-side surface 612. The object-side surface 611 and the image-side surface 612 of the first lens element 610 are aspheric. The first lens element 610 has inflection points formed on the object-side surface 611 and the image-side surface 612 thereof.

The second lens element 620 is made of plastic material. The second lens element 620 with negative refractive power has a convex object-side surface 621 and a concave image-side surface 622. The object-side surface 621 and the image-side surface 622 of the second lens element 620 are aspheric.

The third lens element 630 is made of plastic material. The third lens element 630 with positive refractive power has a convex object-side surface 631 and a convex image-side surface 632. The object-side surface 631 and the image-side surface 632 of the third lens element 630 are aspheric.

The fourth lens element 640 is made of plastic material. The fourth lens element 640 with negative refractive power has a convex object-side surface 641 and a concave image-side surface 642. The object-side surface 641 and the image-side surface 642 of the fourth lens element 640 are aspheric. The fourth lens element 640 has inflection points formed on the object-side surface 641 and the image-side surface 642 thereof.

The fifth lens element 650 is made of plastic material. The fifth lens element 650 with negative refractive power has a concave object-side surface 651 and a concave image-side surface 652. The object-side surface 651 and the image-side surface 652 of the fifth lens element 650 are aspheric.

The sixth lens element 660 is made of plastic material. The sixth lens element 660 with negative refractive power has a concave object-side surface 661 and a convex image-side surface 662. The object-side surface 661 and the image-side surface 662 of the sixth lens element 660 are aspheric. The sixth lens element 660 has inflection points formed on the object-side surface 661 and the image-side surface 662 thereof.

The IR cut filter 680 is made of glass and is located between the sixth lens element 660 and the image plane 670, and will not affect the focal length of the image capturing lens assembly.

The equation of the aspheric surface profiles of the above lens elements of the sixth embodiment is the same as that of the first embodiment, and will not be stated herein again.

In the image capturing lens assembly according to the sixth embodiment, the definitions of f, Fno, HFOV, V2, V3, R1, R2, R3, R4, R5, R6, R7, R8, T12, T23, f1, f3, f6, DIST, SL, TTL and ImgH are the same as those stated in the first embodiment with corresponding values for the sixth embodiment, and they satisfy the following relationships:

| | |
|---|---|
| f(mm) | 5.15 |
| Fno | 3.20 |
| HFOV(deg.) | 33.8 |
| V3 − V2 | 29.3 |
| R1/R2 | 0.09 |
| (R3 − R4)/(R3 + R4) | 0.24 |
| (R5 + R6)/(R5 − R6) | 0.26 |
| R8/R7 | 0.61 |
| T12/T23 | 0.17 |
| f3/f1 | 0.32 |
| f/f3 | 2.08 |
| f/f6 | −0.78 |
| DIST(%) | −36.0 |
| SL/TTL | 0.69 |
| TTL/ImgH | 3.11 |

The detailed optical data of the sixth embodiment are shown in Table 11, and the aspheric surface data are shown in Table 12 as follows.

TABLE 11

6th Embodiment
f = 5.15 mm, Fno = 3.20, HFOV = 33.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 3.830300 (ASP) | 1.185 | Plastic | 1.544 | 55.9 | 7.64 |
| 2 | | 43.478300 (ASP) | 0.100 | | | | |
| 3 | Lens 2 | 1.455460 (ASP) | 0.310 | Plastic | 1.607 | 26.6 | −4.89 |
| 4 | | 0.897870 (ASP) | 0.546 | | | | |
| 5 | Ape. Stop | Plano | 0.030 | | | | |
| 6 | Lens 3 | 3.381400 (ASP) | 1.029 | Plastic | 1.544 | 55.9 | 2.48 |
| 7 | | −2.002010 (ASP) | 0.394 | | | | |
| 8 | Lens 4 | 4.172000 (ASP) | 0.357 | Plastic | 1.634 | 23.8 | −11.18 |
| 9 | | 2.539160 (ASP) | 0.303 | | | | |
| 10 | Lens 5 | −83.333300 (ASP) | 0.568 | Plastic | 1.544 | 55.9 | −28.22 |
| 11 | | 18.867900 (ASP) | 0.582 | | | | |
| 12 | Lens 6 | −1.724700 (ASP) | 0.801 | Plastic | 1.530 | 55.8 | −6.60 |
| 13 | | −3.949400 (ASP) | 0.300 | | | | |
| 14 | IR-filter | Plano | 0.200 | Glass | 1.517 | 64.2 | — |
| 15 | | Plano | 0.210 | | | | |
| 16 | Image | Plano | — | | | | |

Note:
Reference wavelength (d-line) is 587.6 nm

TABLE 12

Aspheric Coefficients

| Surface # | 1 | 2 | 3 | 4 | 6 | 7 |
|---|---|---|---|---|---|---|
| k = | −2.04718E+00 | −5.00000E+01 | −1.81700E−01 | −8.62386E−02 | 5.14144E+00 | −5.17013E−02 |
| A4 = | −2.17012E−02 | −4.45617E−02 | −7.98794E−02 | −1.45956E−01 | −3.56516E−02 | −1.47500E−01 |
| A6 = | −4.41988E−03 | 7.89316E−03 | −5.57400E−03 | −5.57595E−02 | −6.13440E−02 | 7.26353E−02 |
| A8 = | −2.38211E−05 | −5.23895E−04 | 9.20063E−03 | −1.12545E−02 | 1.58454E−01 | −5.95215E−02 |
| A10 = | 3.06559E−04 | 9.02895E−06 | −4.49552E−03 | −1.66448E−02 | −2.74934E−01 | 1.35776E−02 |
| A12 = | −2.15113E−05 | | | | 1.69417E−01 | |
| A14 = | −2.10430E−06 | | | | | |

| Surface # | 8 | 9 | 10 | 11 | 12 | 13 |
|---|---|---|---|---|---|---|
| k = | 3.00220E+00 | 4.40286E−01 | 5.00000E+01 | −5.00000E+01 | −3.88369E−01 | −9.48854E+00 |
| A4 = | −2.87340E−01 | −1.71335E−01 | −3.35086E−02 | −2.63165E−02 | 9.24109E−02 | −1.17215E−01 |
| A6 = | 5.04236E−02 | 1.63639E−02 | −1.38308E−02 | −1.84343E−02 | −2.14115E−02 | 2.18395E−02 |
| A8 = | −6.14230E−02 | 3.56915E−02 | 6.54590E−03 | 7.61041E−03 | 4.64120E−03 | 2.89703E−03 |
| A10 = | 8.55692E−02 | −3.14071E−02 | 2.48983E−03 | −1.01003E−03 | −2.00729E−04 | −1.95947E−03 |
| A12 = | −7.14523E−02 | 1.41808E−02 | 9.85721E−04 | | −2.26665E−05 | 3.95522E−04 |
| A14 = | 2.58273E−02 | −2.42668E−03 | −1.02950E−03 | | | −2.78993E−05 |
| A16 = | | | 1.55565E−04 | | | |

Figure 13:
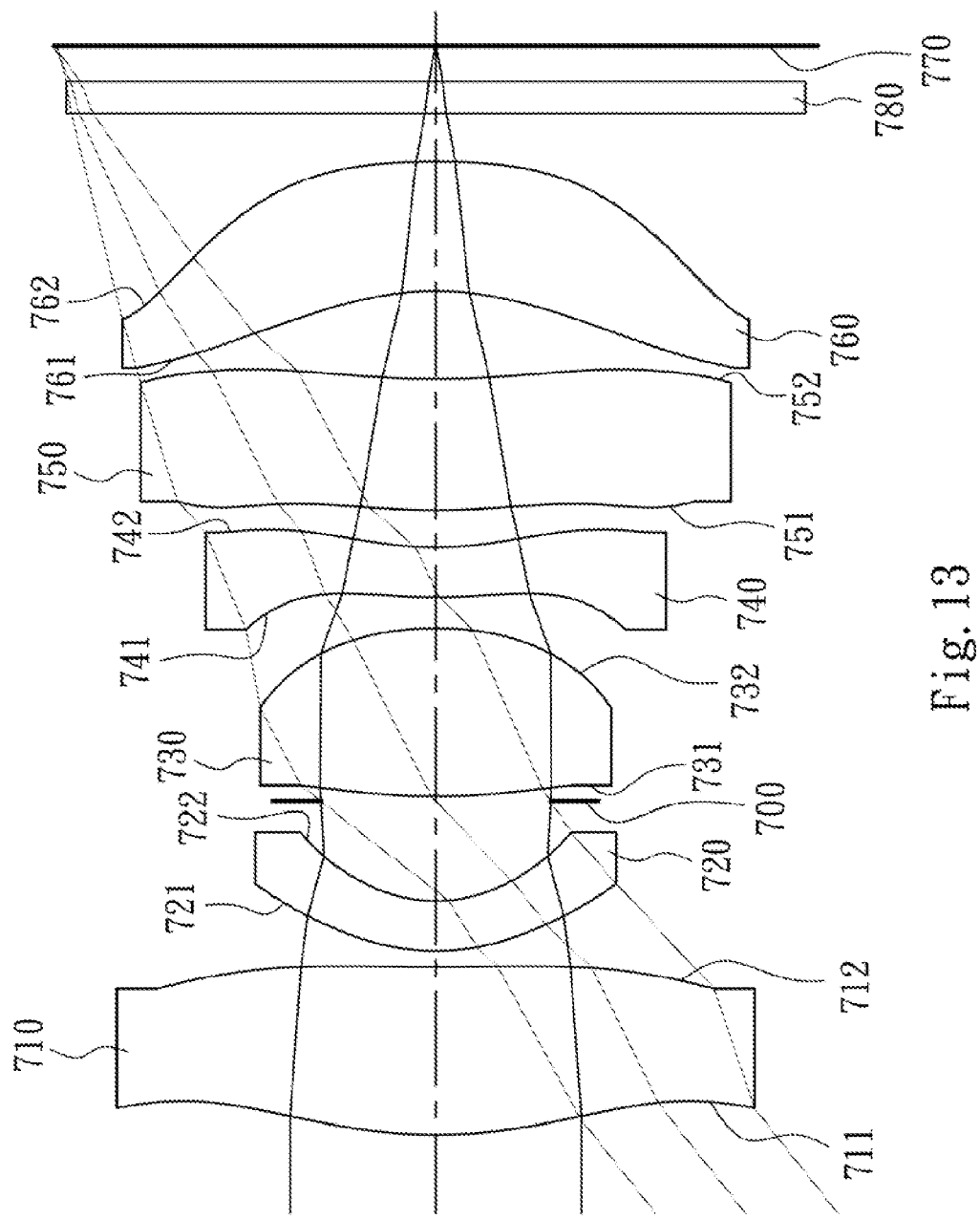
FIG. 13 is a schematic view of an image capturing lens assembly according to the seventh embodiment of the present disclosure.
Figure 14:
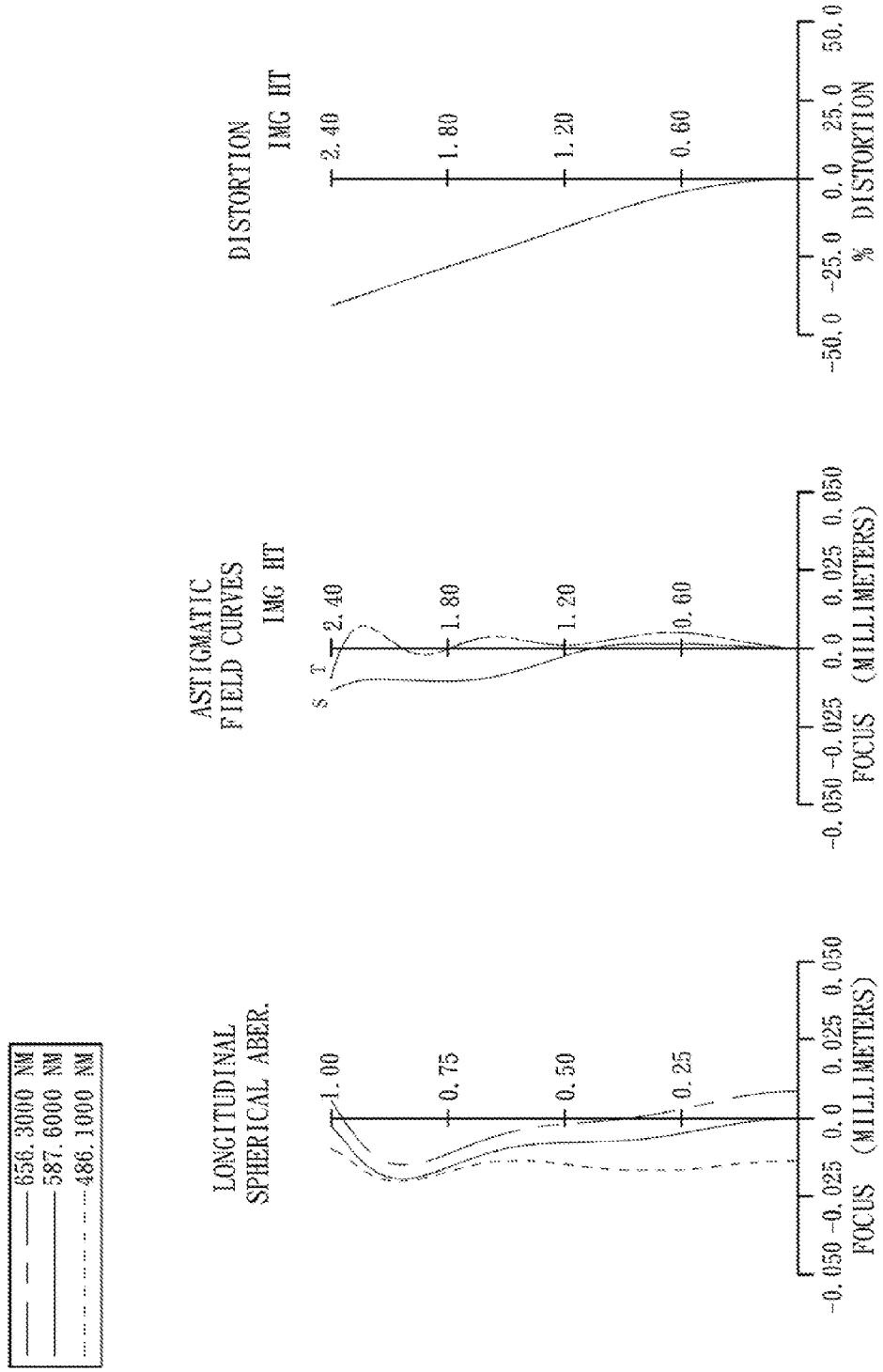
FIG. 14 shows spherical aberration curves, astigmatic field curves and distortion curve of the image capturing lens assembly according to the seventh embodiment of the present disclosure.

FIG. 13 is a schematic view of an image capturing lens assembly according to the seventh embodiment of the present disclosure. FIG. 14 shows spherical aberration curves, astigmatic field curves and distortion curve of the image capturing lens assembly according to the seventh embodiment of the present disclosure. In FIG. 13, the image capturing lens assembly includes, in order from an object side to an image side: the first lens element 710, the second lens element 720, an aperture stop 700, the third lens element 730, the fourth lens element 740, the fifth lens element 750, the sixth lens element 760, an IR (infrared) cut filter 780 and an image plane 770.

The first lens element 710 is made of plastic material. The first lens element 710 with positive refractive power has a convex object-side surface 711 and a concave image-side surface 712. The object-side surface 711 and the image-side surface 712 of the first lens element 710 are aspheric. The first lens element 710 has inflection points formed on the object-side surface 711 and the image-side surface 712 thereof.

The second lens element 720 is made of plastic material. The second lens element 720 with negative refractive power has a convex object-side surface 721 and a concave image-side surface 722. The object-side surface 721 and the image-side surface 722 of the second lens element 720 are aspheric.

The third lens element 730 is made of plastic material. The third lens element 730 with positive refractive power has a convex object-side surface 731 and a convex image-side surface 732. The object-side surface 731 and the image-side surface 732 of the third lens element 730 are aspheric.

The fourth lens element 740 is made of plastic material. The fourth lens element 740 with negative refractive power has a convex object-side surface 741 and a concave image-side surface 742. The object-side surface 741 and the image-side surface 742 of the fourth lens element 740 are aspheric. The fourth lens element 740 has inflection points formed on the object-side surface 741 and the image-side surface 742 thereof.

The fifth lens element 750 is made of plastic material. The fifth lens element 750 with positive refractive power has a convex object-side surface 751 and a concave image-side surface 752. The object-side surface 751 and the image-side surface 752 of the fifth lens element 750 are aspheric.

The sixth lens element 760 is made of plastic material. The sixth lens element 760 with negative refractive power has a concave object-side surface 761 and a convex image-side surface 762. The object-side surface 761 and the image-side surface 762 of the sixth lens element 760 are aspheric. The sixth lens element 760 has inflection points formed on the object-side surface 761 and the image-side surface 762 thereof.

The IR cut filter 780 is made of glass and is located between the sixth lens element 760 and the image plane 770, and will not affect the focal length of the image capturing lens assembly.

The equation of the aspheric surface profiles of the above lens elements of the seventh embodiment is the same as that of the first embodiment, and will not be stated herein again.

In the image capturing lens assembly according to the seventh embodiment, the definitions of f, Fno, HFOV, V2, V3, R1, R2, R3, R4, R5, R6, R7, R8, T12, T23, f1, f3, f6, DIST, SL, TTL and ImgH are the same as those stated in the first embodiment with corresponding values for the seventh embodiment, and they satisfy the following relationships:

| | |
|---|---|
| f(mm) | 5.12 |
| Fno | 2.80 |
| HFOV(deg.) | 38.2 |
| V3 − V2 | 29.9 |
| R1/R2 | 0.16 |
| (R3 − R4)/(R3 + R4) | 0.22 |
| (R5 + R6)/(R5 − R6) | 0.34 |
| R8/R7 | 0.61 |
| T12/T23 | 0.15 |
| f3/f1 | 0.41 |
| f/f3 | 1.82 |
| f/f6 | −0.82 |
| DIST(%) | −40.4 |
| SL/TTL | 0.69 |
| TTL/ImgH | 2.83 |

The detailed optical data of the seventh embodiment are shown in Table 13, and the aspheric surface data are shown in Table 14 as follows.

TABLE 13

7th Embodiment
f = 5.12 mm, Fno = 2.80, HFOV = 38.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 3.187800 (ASP) | 1.057 | Plastic | 1.544 | 55.9 | 6.85 |
| 2 | | 19.385500 (ASP) | 0.100 | | | | |
| 3 | Lens 2 | 1.408260 (ASP) | 0.310 | Plastic | 1.607 | 26.6 | −5.40 |
| 4 | | 0.903070 (ASP) | 0.629 | | | | |
| 5 | Ape. Stop | Plano | 0.030 | | | | |
| 6 | Lens 3 | 4.371600 (ASP) | 1.056 | Plastic | 1.543 | 56.5 | 2.82 |
| 7 | | −2.156300 (ASP) | 0.200 | | | | |
| 8 | Lens 4 | 3.454900 (ASP) | 0.310 | Plastic | 1.634 | 23.8 | −9.16 |
| 9 | | 2.091190 (ASP) | 0.234 | | | | |
| 10 | Lens 5 | 4.496100 (ASP) | 0.826 | Plastic | 1.530 | 55.8 | 33.96 |
| 11 | | 5.612100 (ASP) | 0.555 | | | | |
| 12 | Lens 6 | −1.794120 (ASP) | 0.815 | Plastic | 1.530 | 55.8 | −6.23 |
| 13 | | −4.551700 (ASP) | 0.300 | | | | |
| 14 | IR-filter | Plano | 0.200 | Glass | 1.517 | 64.2 | — |
| 15 | | Plano | 0.229 | | | | |
| 16 | Image | Plano | — | | | | |

Note:
Reference wavelength (d-line) is 587.6 nm

TABLE 14

Aspheric Coefficients

| Surface # | 1 | 2 | 3 | 4 | 6 | 7 |
|---|---|---|---|---|---|---|
| k = | −1.09798E+00 | 7.63065E+00 | −2.51876E−02 | −1.26008E−01 | 7.73065E+00 | 2.14392E−01 |
| A4 = | −2.02613E−02 | −4.11633E−02 | −7.59142E−02 | −1.27544E−01 | −1.76387E−02 | −1.56554E−01 |
| A6 = | −4.71639E−03 | 7.60551E−03 | −1.39097E−02 | −6.51430E−02 | −7.65915E−02 | 8.34989E−02 |
| A8 = | −1.07929E−04 | −9.36666E−04 | 1.07909E−05 | −4.55747E−02 | 1.83738E−01 | −4.69004E−02 |
| A10 = | 2.91162E−04 | 1.07318E−04 | 2.00211E−03 | −1.46923E−02 | −3.03559E−01 | −1.28367E−04 |
| A12 = | −1.98002E−05 | | | | 1.69158E−01 | |
| A14 = | −1.16536E−06 | | | | | |

| Surface # | 8 | 9 | 10 | 11 | 12 | 13 |
|---|---|---|---|---|---|---|
| k = | 4.60880E+00 | 2.41287E−01 | −3.74021E+01 | −3.83588E+01 | −4.12235E−01 | −1.81744E+01 |
| A4 = | −2.61981E−01 | −1.70989E−01 | −4.18786E−02 | −4.10912E−03 | 8.83601E−02 | −1.26722E−01 |
| A6 = | 6.41333E−02 | 1.06227E−02 | −1.43388E−02 | −1.92229E−02 | −2.07210E−02 | 2.12343E−02 |
| A8 = | −7.01269E−02 | 3.32874E−02 | 6.34303E−03 | 7.74135E−03 | 4.77058E−03 | 2.64359E−03 |
| A10 = | 8.18730E−02 | −3.25229E−02 | 2.55826E−03 | −9.67181E−04 | −2.06477E−04 | −1.99030E−03 |
| A12 = | −7.17746E−02 | 1.39889E−02 | 1.03682E−03 | | −3.72312E−05 | 4.04400E−04 |
| A14 = | 2.38757E−02 | −2.12710E−03 | −1.01426E−03 | | | −2.10093E−05 |
| A16 = | | | 1.51740E−04 | | | |

Figure 15:
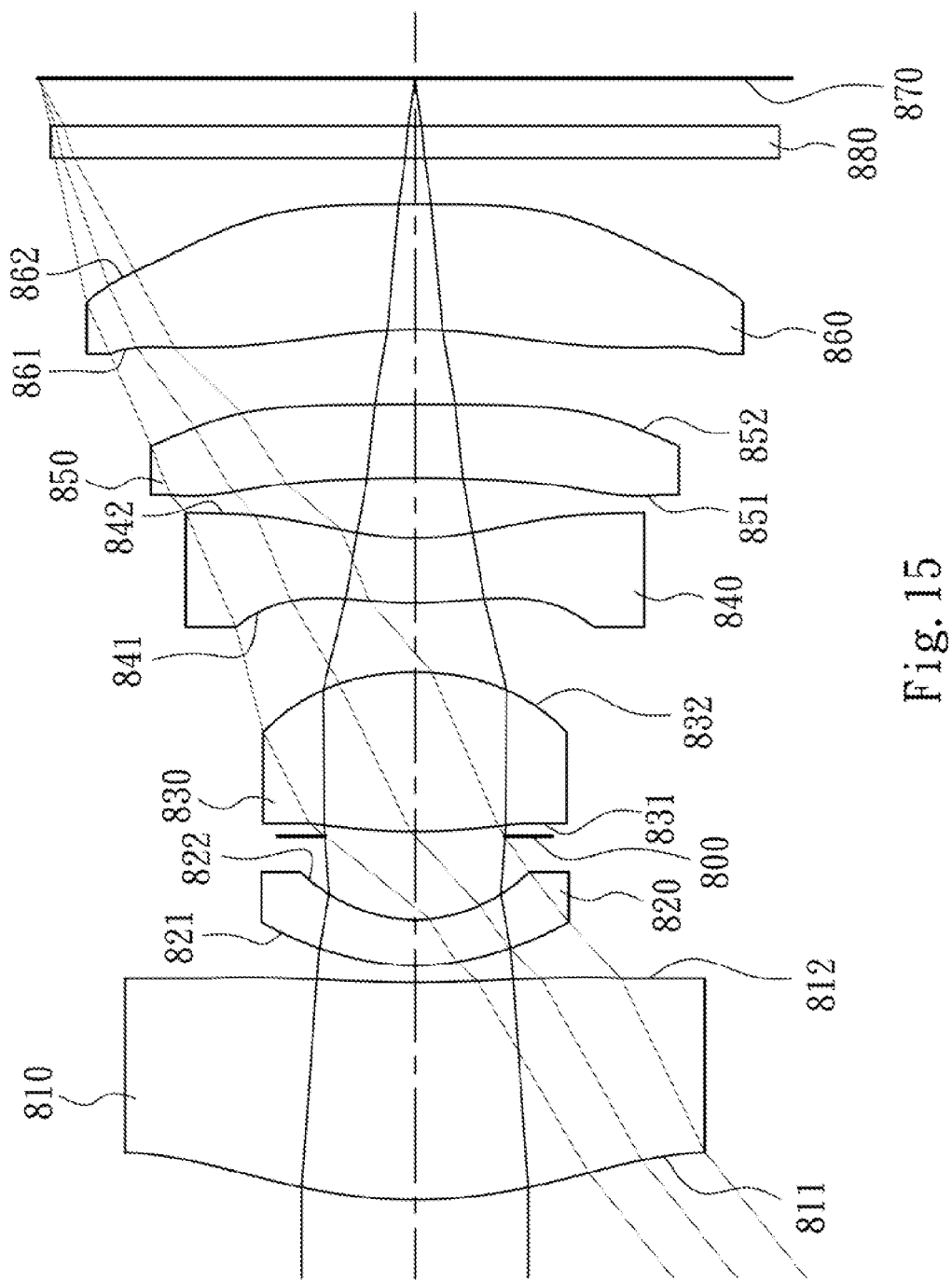
FIG. 15 is a schematic view of an image capturing lens assembly according to the eighth embodiment of the present disclosure.
Figure 16:
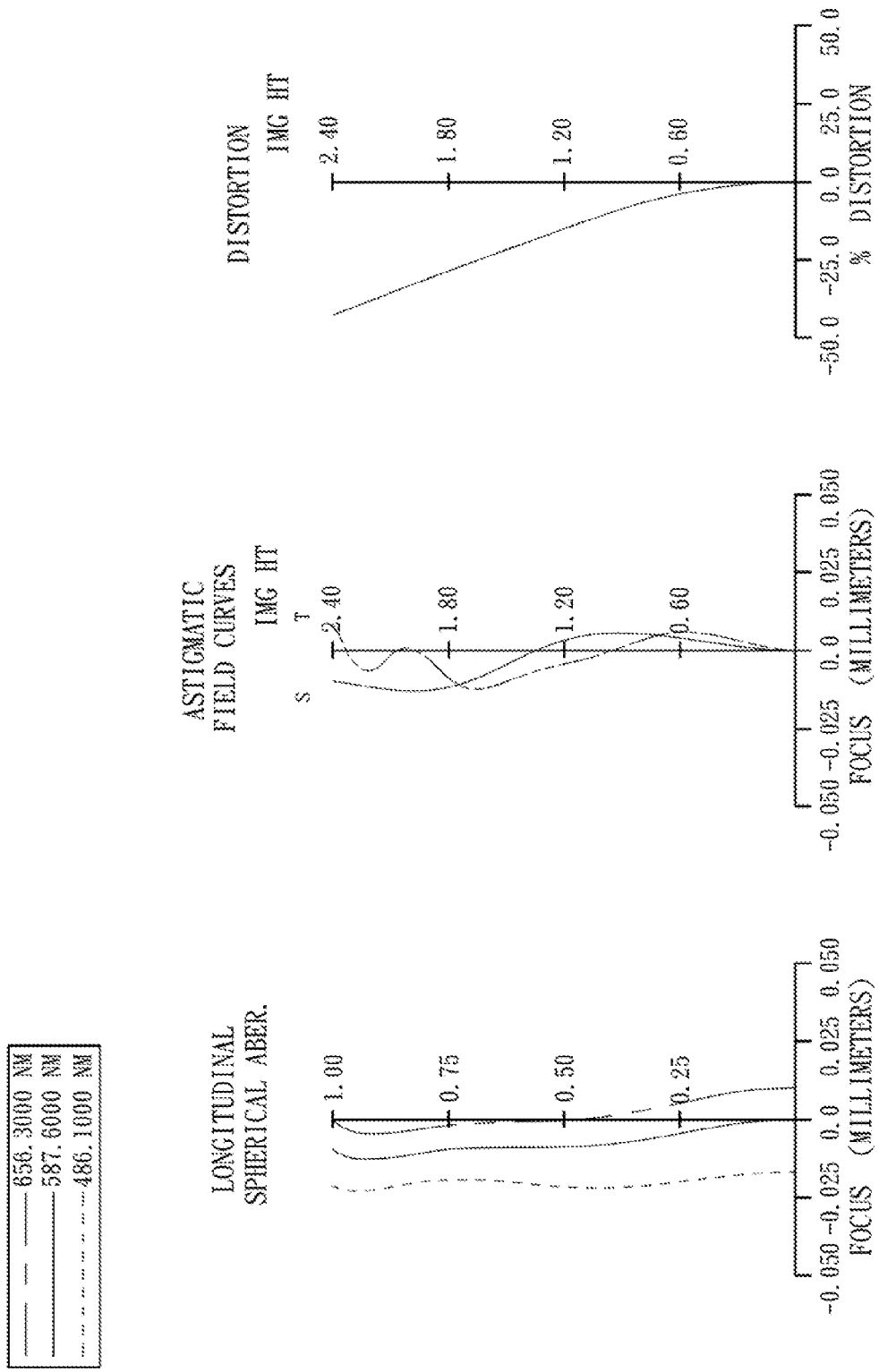
FIG. 16 shows spherical aberration curves, astigmatic field curves and distortion curve of the image capturing lens assembly according to the eighth embodiment of the present disclosure.

FIG. 15 is a schematic view of an image capturing lens assembly according to the eighth embodiment of the present disclosure. FIG. 16 shows spherical aberration curves, astigmatic field curves and distortion curve of the image capturing lens assembly according to the eighth embodiment of the present disclosure. In FIG. 15, the image capturing lens assembly includes, in order from an object side to an image side: the first lens element 810, the second lens element 820, an aperture stop 800, the third lens element 830, the fourth lens element 840, the fifth lens element 850, the sixth lens element 860, an IR (infrared) cut filter 880 and an image plane 870.

The first lens element 810 is made of plastic material. The first lens element 810 with positive refractive power has a convex object-side surface 811 and a concave image-side surface 812. The object-side surface 811 and the image-side surface 812 of the first lens element 810 are aspheric. The first lens element 810 has inflection points formed on the object-side surface 811 and the image-side surface 812 thereof.

The second lens element 820 is made of plastic material. The second lens element 820 with negative refractive power has a convex object-side surface 821 and a concave image-side surface 822. The object-side surface 821 and the image-side surface 822 of the second lens element 820 are aspheric.

The third lens element 830 is made of plastic material. The third lens element 830 with positive refractive power has a convex object-side surface 831 and a convex image-side surface 832. The object-side surface 831 and the image-side surface 832 of the third lens element 830 are aspheric.

The fourth lens element 840 is made of plastic material. The fourth lens element 840 with negative refractive power has a convex object-side surface 841 and a concave image-side surface 842. The object-side surface 841 and the image-side surface 842 of the fourth lens element 840 are aspheric. The fourth lens element 840 has inflection points formed on the object-side surface 841 and the image-side surface 842 thereof.

The fifth lens element 850 is made of plastic material. The fifth lens element 850 with negative refractive power has a concave object-side surface 851 and a convex image-side surface 852. The object-side surface 851 and the image-side surface 852 of the fifth lens element 850 are aspheric.

The sixth lens element 860 is made of plastic material. The sixth lens element 860 with negative refractive power has a concave object-side surface 861 and a convex image-side surface 862. The object-side surface 861 and the image-side surface 862 of the sixth lens element 860 are aspheric. The sixth lens element 860 has inflection points formed on the object-side surface 861 and the image-side surface 862 thereof.

The IR cut filter 880 is made of glass and is located between the sixth lens element 860 and the image plane 870, and will not affect the focal length of the image capturing lens assembly.

The equation of the aspheric surface profiles of the above lens elements of the eighth embodiment is the same as that of the first embodiment, and will not be stated herein again.

In the image capturing lens assembly according to the eighth embodiment, the definitions of f, Fno, HFOV, V2, V3, R1, R2, R3, R4, R5, R6, R7, R8, T12, T23, f1, f3, f6, DIST, SL, TTL and ImgH are the same as those stated in the first embodiment with corresponding values for the eighth embodiment, and they satisfy the following relationships:

| | |
|---|---|
| f(mm) | 5.19 |
| Fno | 3.60 |
| HFOV(deg.) | 38.9 |
| V3 − V2 | 29.3 |
| R1/R2 | 0.41 |
| (R3 − R4)/(R3 + R4) | 0.25 |
| (R5 + R6)/(R5 − R6) | 0.36 |
| R8/R7 | 0.64 |
| T12/T23 | 0.19 |
| f3/f1 | 0.27 |
| f/f3 | 2.14 |
| f/f6 | −0.80 |
| DIST(%) | −42.6 |
| SL/TTL | 0.67 |
| TTL/ImgH | 2.95 |

The detailed optical data of the eighth embodiment are shown in Table 15, and the aspheric surface data are shown in Table 16 as follows.

TABLE 15

8th Embodiment
f = 5.19 mm, Fno = 3.60, HFOV = 38.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 3.138900 (ASP) | 1.387 | Plastic | 1.530 | 55.8 | 9.05 |
| 2 | | 7.692300 (ASP) | 0.110 | | | | |
| 3 | Lens 2 | 1.549160 (ASP) | 0.290 | Plastic | 1.607 | 26.6 | −4.77 |
| 4 | | 0.938150 (ASP) | 0.537 | | | | |
| 5 | Ape. Stop | Plano | 0.030 | | | | |
| 6 | Lens 3 | 3.870400 (ASP) | 1.012 | Plastic | 1.544 | 55.9 | 2.43 |
| 7 | | −1.820070 (ASP) | 0.446 | | | | |
| 8 | Lens 4 | 2.841610 (ASP) | 0.410 | Plastic | 1.614 | 25.6 | −9.86 |
| 9 | | 1.827630 (ASP) | 0.385 | | | | |
| 10 | Lens 5 | −11.607000 (ASP) | 0.469 | Plastic | 1.544 | 55.9 | −38.94 |
| 11 | | −26.032400 (ASP) | 0.475 | | | | |
| 12 | Lens 6 | −3.339300 (ASP) | 0.800 | Plastic | 1.535 | 56.3 | −6.53 |
| 13 | | −82.346000 (ASP) | 0.300 | | | | |
| 14 | IR-filter | Plano | 0.200 | Glass | 1.517 | 64.2 | — |
| 15 | | Plano | 0.306 | | | | |
| 16 | Image | Plano | — | | | | |

Note:
Reference wavelength (d-line) is 587.6 nm

TABLE 16

Aspheric Coefficients

| Surface # | 1 | 2 | 3 | 4 | 6 | 7 |
|---|---|---|---|---|---|---|
| k = | −2.01627E−01 | −1.60589E+00 | 6.08136E−02 | 2.71227E−02 | 6.88666E+00 | 1.56433E−01 |
| A4 = | −1.47820E−02 | −4.13255E−02 | −1.16386E−01 | −1.84635E−01 | −5.39000E−02 | −1.38086E−01 |
| A6 = | −3.00634E−03 | 8.50792E−03 | 4.30151E−02 | 9.86011E−02 | −3.58016E−02 | 6.64627E−02 |
| A8 = | −6.81050E−04 | −1.89317E−03 | −8.66876E−03 | −2.20227E−01 | 4.53456E−02 | −5.08860E−02 |
| A10 = | 2.58515E−04 | 6.85204E−04 | 3.21226E−03 | 2.59529E−01 | −4.60229E−02 | 6.53913E−03 |
| A12 = | −1.30588E−05 | | | | −1.32863E−02 | |
| A14 = | 3.89694E−07 | | | | | |

| Surface # | 8 | 9 | 10 | 11 | 12 | 13 |
|---|---|---|---|---|---|---|
| k = | −1.69825E+00 | 2.48460E−02 | −3.15902E+00 | 9.36317E+01 | −2.34846E−01 | 0.00000E+00 |
| A4 = | −2.68907E−01 | −1.84557E−01 | −1.21306E−02 | 3.35084E−03 | 6.23188E−02 | −1.01425E−01 |
| A6 = | 6.39777E−02 | 1.58526E−02 | −1.58836E−02 | −3.03184E−02 | −9.72800E−03 | 1.49459E−02 |
| A8 = | −8.85537E−02 | 3.37702E−02 | 5.53684E−03 | 7.73372E−03 | −5.65763E−03 | 6.80690E−03 |
| A10 = | 9.59904E−02 | −3.23282E−02 | 2.42608E−03 | −2.49323E−04 | 1.84885E−03 | −2.38470E−03 |
| A12 = | −5.25620E−02 | 1.39418E−02 | 1.09416E−03 | 1.89101E−05 | −2.24846E−04 | 2.41515E−04 |
| A14 = | 1.33136E−02 | −2.35732E−03 | −9.76233E−04 | | | −8.91324E−06 |
| A16 = | | | 1.31980E−04 | | | |

Figure 17:
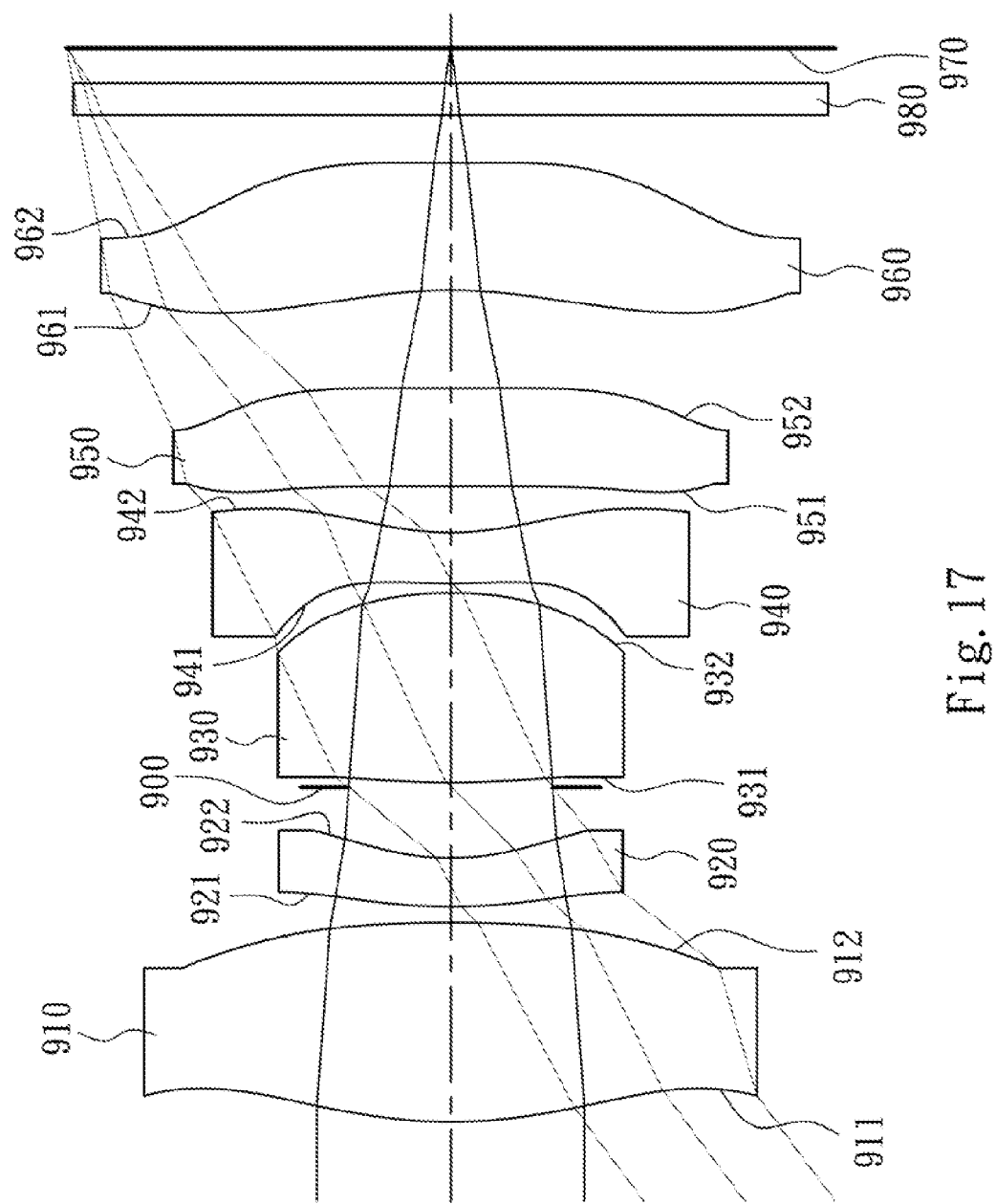
FIG. 17 is a schematic view of an image capturing lens assembly according to the ninth embodiment of the present disclosure.
Figure 18:
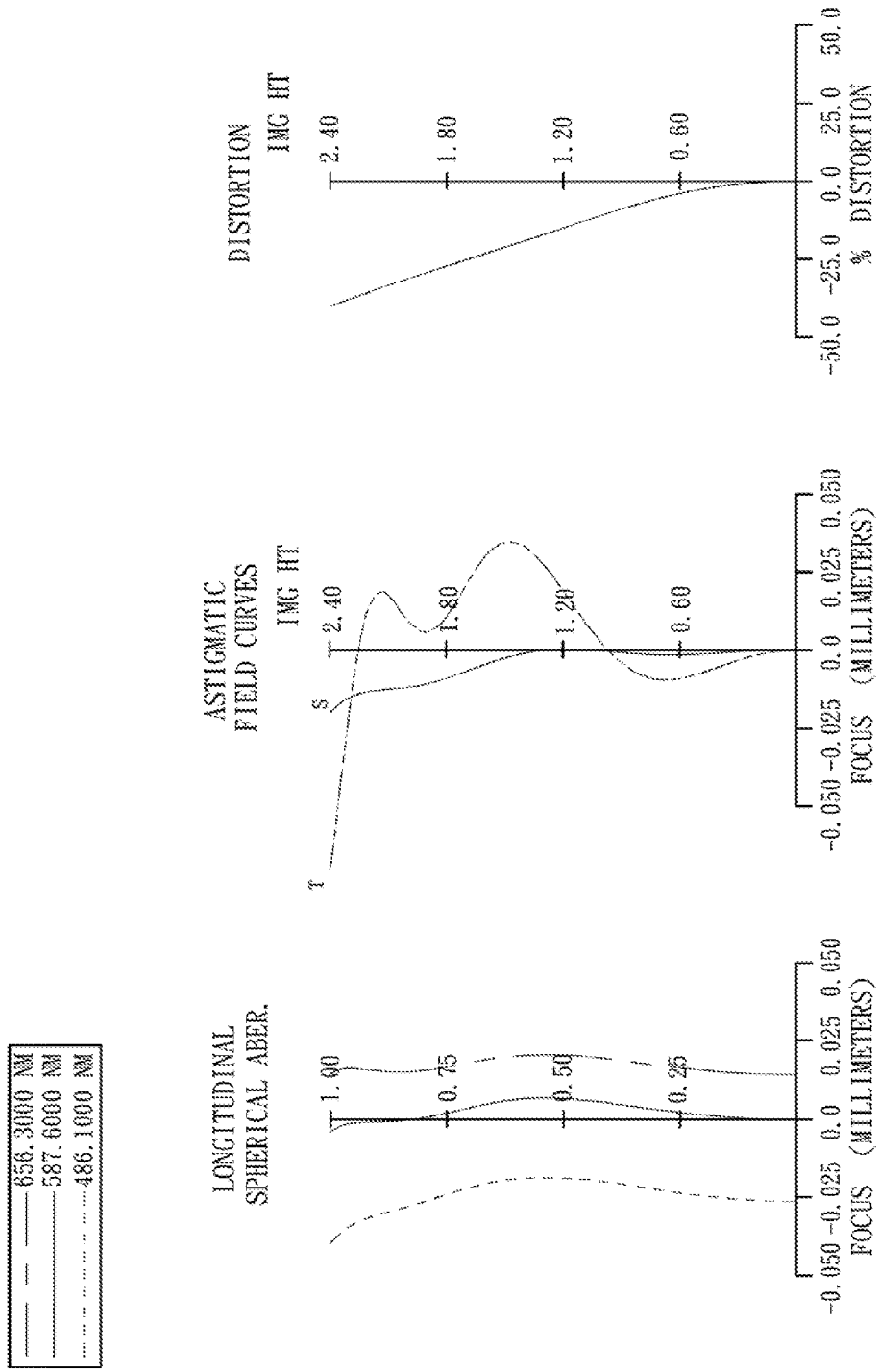
FIG. 18 shows spherical aberration curves, astigmatic field curves and distortion curve of the image capturing lens assembly according to the ninth embodiment of the present disclosure.

FIG. 17 is a schematic view of an image capturing lens assembly according to the ninth embodiment of the present disclosure. FIG. 18 shows spherical aberration curves, astigmatic field curves and distortion curve of the image capturing lens assembly according to the ninth embodiment of the present disclosure. In FIG. 17, the image capturing lens assembly includes, in order from an object side to an image side: the first lens element 910, the second lens element 920, an aperture stop 900, the third lens element 930, the fourth lens element 940, the fifth lens element 950, the sixth lens element 960, an IR (infrared) cut filter 980 and an image plane 970.

The first lens element 910 is made of plastic material. The first lens element 910 with positive refractive power has a convex object-side surface 911 and a convex image-side surface 912. The object-side surface 911 and a convex image-side surface 912 of the first lens element 910 are aspheric. The first lens element 910 has inflection points formed on the object-side surface 911 and the image-side surface 912 thereof.

The second lens element 920 is made of plastic material. The second lens element 920 with negative refractive power has a convex object-side surface 921 and a concave image-side surface 922. The object-side surface 921 and the image-side surface 922 of the second lens element 920 are aspheric.

The third lens element 930 is made of glass. The third lens element 930 with positive refractive power has a convex object-side surface 931 and a convex image-side surface 932. The object-side surface 931 and the image-side surface 932 of the third lens element 930 are aspheric.

The fourth lens element 940 is made of plastic material. The fourth lens element 940 with negative refractive power has a convex object-side surface 941 and a concave image-side surface 942. The object-side surface 941 and the image-side surface 942 of the fourth lens element 940 are aspheric. The fourth lens element 940 has inflection points formed on the object-side surface 941 and the image-side surface 942 thereof.

The fifth lens element 950 is made of plastic material. The fifth lens element 950 with negative refractive power has a convex object-side surface 951 and a concave image-side surface 952. The object-side surface 951 and the image-side surface 952 of the fifth lens element 950 are aspheric.

The sixth lens element 960 is made of plastic material. The sixth lens element 960 with negative refractive power has a concave object-side surface 961 and a concave image-side surface 962. The object-side surface 961 and the image-side surface 962 of the sixth lens element 960 are aspheric. The sixth lens element 960 has inflection points formed on the object-side surface 961 and the image-side surface 962 thereof.

The IR cut filter 980 is made of glass and is located between the sixth lens element 960 and the image plane 970, and will not affect the focal length of the image capturing lens assembly.

The equation of the aspheric surface profiles of the above lens elements of the ninth embodiment is the same as that of the first embodiment, and will not be stated herein again.

In the image capturing lens assembly according to the ninth embodiment, the definitions of f, Fno, HFOV, V2, V3, R1, R2, R3, R4, R5, R6, R7, R8, T12, T23, f1, f3, f6, DIST, SL, TTL and ImgH are the same as those stated in the first embodiment with corresponding values for the ninth embodiment, and they satisfy the following relationships:

| f(mm) | 5.37 |
|---|---|
| Fno | 3.20 |
| HFOV(deg.) | 36.6 |
| V3 − V2 | 6.1 |
| R1/R2 | −0.32 |
| (R3 − R4)/(R3 + R4) | 0.35 |
| (R5 + R6)/(R5 − R6) | 0.48 |
| R8/R7 | 0.32 |
| T12/T23 | 0.21 |
| f3/f1 | 0.55 |
| f/f3 | 2.10 |
| f/f6 | −1.11 |
| DIST(%) | −39.8 |
| SL/TTL | 0.69 |
| TTL/ImgH | 2.78 |

The detailed optical data of the ninth embodiment are shown in Table 17, and the aspheric surface data are shown in Table 18 as follows.

TABLE 17

9th Embodiment
f = 5.37 mm, Fno = 3.20, HFOV = 36.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 3.134000 (ASP) | 1.252 | Plastic | 1.535 | 56.3 | 4.61 |
| 2 | | −9.895500 (ASP) | 0.100 | | | | |
| 3 | Lens 2 | 3.390900 (ASP) | 0.310 | Plastic | 1.633 | 23.4 | −5.38 |
| 4 | | 1.639330 (ASP) | 0.441 | | | | |
| 5 | Ape. Stop | Plano | 0.030 | | | | |
| 6 | Lens 3 | 6.608300 (ASP) | 1.195 | Glass | 1.717 | 29.5 | 2.55 |
| 7 | | −2.344200 (ASP) | 0.060 | | | | |
| 8 | Lens 4 | 5.599400 (ASP) | 0.315 | Plastic | 1.633 | 23.4 | −4.28 |
| 9 | | 1.785050 (ASP) | 0.294 | | | | |
| 10 | Lens 5 | 926.642800 (ASP) | 0.614 | Plastic | 1.544 | 55.9 | −255.91 |
| 11 | | 121.033500 (ASP) | 0.618 | | | | |
| 12 | Lens 6 | −2.974590 (ASP) | 0.800 | Plastic | 1.530 | 55.8 | −4.82 |
| 13 | | 19.855800 (ASP) | 0.300 | | | | |
| 14 | IR-filter | Plano | 0.200 | Glass | 1.517 | 64.2 | — |
| 15 | | Plano | 0.222 | | | | |
| 16 | Image | Plano | — | | | | |

Note:
Reference wavelength (d-line) is 587.6 nm

TABLE 18

Aspheric Coefficients

| Surface # | 1 | 2 | 3 | 4 | 6 | 7 |
|---|---|---|---|---|---|---|
| k = | −1.20891E+00 | −5.13200E+01 | 2.45317E+00 | 6.31817E−01 | 1.16021E+01 | −2.43646E+00 |
| A4 = | −1.97144E−02 | −3.63840E−02 | −5.23572E−02 | −8.82310E−02 | 7.54154E−04 | −1.09590E−01 |
| A6 = | −4.54607E−03 | 8.62588E−03 | −2.16910E−02 | −1.01107E−01 | −7.02784E−02 | 6.17394E−02 |
| A8 = | −3.53400E−04 | −1.56884E−03 | 2.25964E−03 | −5.20020E−03 | 1.18028E−01 | −7.52066E−02 |
| A10 = | 2.89895E−04 | 1.57947E−04 | 1.54945E−03 | 1.58864E−02 | −2.91161E−01 | 2.24897E−02 |
| A12 = | −1.36484E−05 | | | | 2.33916E−01 | |
| A14 = | −1.51055E−06 | | | | | |

| Surface # | 8 | 9 | 10 | 11 | 12 | 13 |
|---|---|---|---|---|---|---|
| k = | −2.56489E+01 | 1.15423E−01 | −1.77000E+01 | −1.92300E+01 | −9.49492E−02 | 2.10000E+01 |
| A4 = | −2.92209E−01 | −1.93052E−01 | −8.72239E−03 | −1.50552E−02 | 7.95022E−02 | −1.22986E−01 |
| A6 = | 6.23514E−02 | 1.50762E−02 | −1.62352E−02 | −3.00204E−02 | −2.12265E−02 | 2.41904E−02 |
| A8 = | −1.09894E−01 | 3.32222E−02 | 4.81286E−03 | 8.02474E−03 | 4.40677E−03 | 3.02062E−03 |
| A10 = | 7.32641E−02 | −3.31604E−02 | 2.18589E−03 | 7.39087E−05 | −2.66884E−04 | −1.98677E−03 |
| A12 = | −6.06728E−02 | 1.37128E−02 | 1.06252E−03 | | −1.69920E−05 | 3.90239E−04 |
| A14 = | 3.38944E−02 | −2.21758E−03 | −9.58251E−04 | | | −3.00818E−05 |
| A16 = | | | 1.47089E−04 | | | |

It will be apparent to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims.

What is claimed is:

1. An image capturing lens assembly comprising, in order from an object side to an image side:
   a first lens element with positive refractive power;
   a second lens element with refractive power;
   a third lens element with positive refractive power having a convex image-side surface;
   a fourth lens element with refractive power, wherein at least one surface of the fourth lens element is aspheric;
   a fifth lens element with refractive power, wherein at least one surface of the fifth lens element is aspheric; and
   a sixth lens element with refractive power, wherein at least one surface of the sixth lens element is aspheric, and the sixth lens element has at least one inflection point formed on at least one of the object-side surface and the image-side surface thereof;
   wherein a focal length of the first lens element is f1, a focal length of the third lens element is f3, a curvature radius of the object-side surface of the second lens element is R3, a curvature radius of the image-side surface of the second lens element is R4, and they satisfy the following relationships:

$0.0 < f3/f1 < 0.8$; and $0.0 < (R3-R4)/(R3+R4) < 0.7$.

2. The image capturing lens assembly of claim 1, further comprising:
   a stop, wherein an axial distance between the stop and an image plane is SL, an axial distance between the object-side surface of the first lens element and the image plane is TTL, and they satisfy the following relationship:

$0.55 < SL/TTL < 0.75$.

3. The image capturing lens assembly of claim 2, wherein the distortion of the image capturing lens assembly is DIST, and DIST satisfies the following relationship:

$$DIST<-30\%.$$

4. The image capturing lens assembly of claim 2, wherein the focal length of the image capturing lens assembly is f, a focal length of the sixth lens element is f6, and they satisfy the following relationship:

$$-1.3<f/f6<-0.6.$$

5. The image capturing lens assembly of claim 4, wherein the fourth lens element has at least one inflection point formed on at least one of the object-side surface and the image-side surface thereof.

6. The image capturing lens assembly of claim 4, wherein a curvature radius of the object-side surface of the third lens element is R5, a curvature radius of the image-side surface of the third lens element is R6, and they satisfy the following relationship:

$$0.0<(R5+R6)/(R5-R6)<0.7.$$

7. The image capturing lens assembly of claim 1, wherein a focal length of the image capturing lens assembly is f, the focal length of the third lens element is f3, and they satisfy the following relationship:

$$1.4<f/f3<2.8.$$

8. The image capturing lens assembly of claim 7, wherein the Abbe number of the second lens element is V2, the Abbe number of the third lens element is V3, and they satisfy the following relationship:

$$25.0<V3-V2<45.0.$$

9. The image capturing lens assembly of claim 8, wherein the first lens element has at least one inflection point formed on at least one of the object-side surface and the image-side surface thereof.

10. The image capturing lens assembly of claim 7, wherein a curvature radius of the object-side surface of the fourth lens element is R7, a curvature radius of the image-side surface of the fourth lens element is R8, and they satisfy the following relationship:

$$0.2<R8/R7<0.8.$$

11. The image capturing lens assembly of claim 7, wherein an axial distance between the first lens element and the second lens element is T12, an axial distance between the second lens element and the third lens element is T23, and they satisfy the following relationship:

$$0.01<T12/T23<0.3.$$

12. The image capturing lens assembly of claim 7, wherein the focal length of the first lens element is f1, the focal length of the third lens element is f3, and they satisfy the following relationship:

$$0.15<f3/f1<0.45.$$

* * * * *